US011958609B2

(12) United States Patent
Brown et al.

(10) Patent No.: US 11,958,609 B2
(45) Date of Patent: Apr. 16, 2024

(54) EXPANDABLE AIRCRAFT LAVATORY APPARATUS, SYSTEM, AND METHOD

(71) Applicant: The Boeing Company, Arlington, VA (US)

(72) Inventors: Douglas A. Brown, Edmonds, WA (US); Roland D. Mair, Kenmore, WA (US)

(73) Assignee: THE BOEING COMPANY, Arlington, VA (US)

( * ) Notice: Subject to any disclaimer, the term of this patent is extended or adjusted under 35 U.S.C. 154(b) by 83 days.

(21) Appl. No.: 17/736,192

(22) Filed: May 4, 2022

(65) Prior Publication Data

US 2023/0356843 A1 Nov. 9, 2023

(51) Int. Cl.
*B64D 11/02* (2006.01)

(52) U.S. Cl.
CPC .................. *B64D 11/02* (2013.01)

(58) Field of Classification Search
CPC ........................... B64D 11/02; B64D 11/0023
See application file for complete search history.

(56) References Cited

U.S. PATENT DOCUMENTS

| 2013/0001359 | A1* | 1/2013 | Schliwa | A47K 4/00 244/118.6 |
| 2014/0077033 | A1* | 3/2014 | Scown | B64D 11/02 49/70 |
| 2014/0123571 | A1* | 5/2014 | Swain | B64D 11/0023 29/401.1 |
| 2022/0177136 | A1* | 6/2022 | McIntosh | B64D 11/02 |

* cited by examiner

*Primary Examiner* — Tye William Abell
(74) *Attorney, Agent, or Firm* — COATS & BENNETT, PLLC

(57) ABSTRACT

Alterable aircraft lavatory configurations for improving access for Persons of Restricted Mobility are disclosed comprising incorporating an expandable aircraft lavatory wall-door that can convert from a configuration as a wall in a lavatory having an aircraft lavatory first footprint into a configuration as an expanded door in an expanded aircraft lavatory having an aircraft lavatory second footprint that is larger than the aircraft lavatory first footprint.

20 Claims, 20 Drawing Sheets

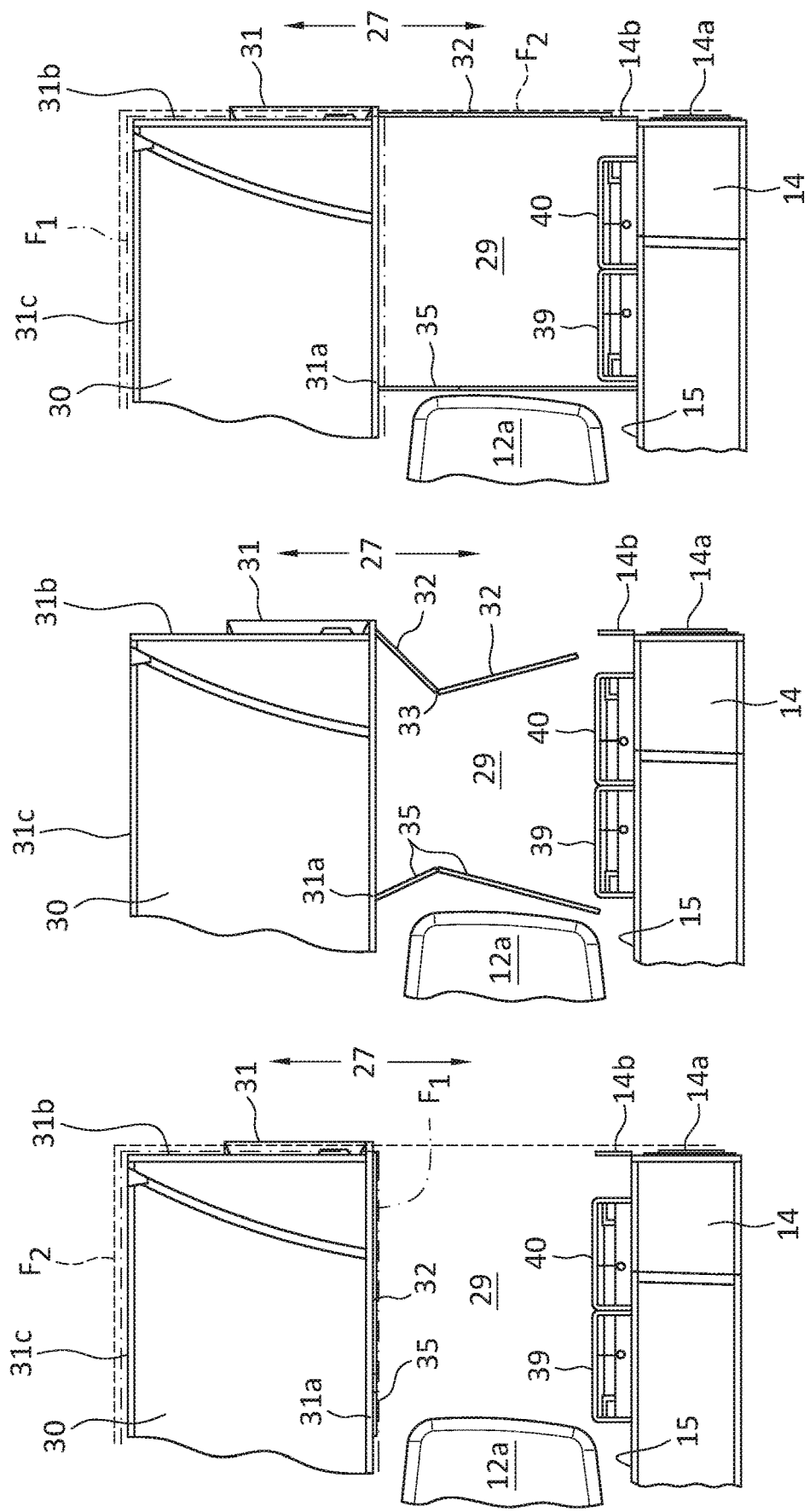

EXPANDABLE AIRCRAFT LAVATORY APPARATUS, SYSTEM, AND METHOD

TECHNOLOGICAL FIELD

The present disclosure relates generally to the field of aircraft cabin monuments. More specifically the present disclosure relates to the field of increasing accessibility for persons of restricted mobility and altering an aircraft cabin lavatory footprint in real time.

BACKGROUND

Lavatories have typically not been dimensioned to accommodate Persons of Reduced Mobility (PRM). PRM lavatories may require more internal space than a standard lavatory, and further may require additional exterior space adjacent the PRM lavatory, such as for maneuvering into and out of the PRM lavatory. In structures including, for example, aircraft cabins, available space to accommodate monuments including, for example, space for lavatories is at a premium. Dedicating a particular lavatory footprint that would enable PRMs to access every aircraft lavatory is often not possible, at least in view of potentially competing spatial factors including, for example, seating and seating capacity concerns, etc.

Unless explicitly identified as such, no statement herein is admitted as prior art merely by its inclusion in the Technological Field and/or Background section.

SUMMARY

Present aspects are directed to apparatuses, systems, and methods for reconciling passenger comfort and convenience with aircraft design and other economic factors regarding space usage aboard, for example, a passenger aircraft.

Present aspects are directed to altering, converting, increasing lavatory dimensions of an aircraft lavatory, that can be, for example, an aircraft cabin outboard lavatory, from a lavatory first footprint having a lavatory first footprint area into a second lavatory footprint having a lavatory second footprint area, with the lavatory second footprint dimensioned to accommodate a PRM, and with the lavatory second footprint area that is larger than the lavatory first footprint area.

In a further aspect, the second lavatory footprint encompasses at least a portion of a passenger egress area (also referred to equivalently herein as an aircraft door entry area) including, for example, an aircraft entry door aisle area.

According to a present aspect, an expandable aircraft lavatory is disclosed, with the expandable aircraft lavatory including an expandable aircraft lavatory first footprint when the expandable aircraft lavatory is in an unexpanded aircraft lavatory configuration, with the aircraft lavatory first footprint having an aircraft lavatory first footprint area. The aircraft lavatory first footprint is bounded by at least three aircraft lavatory first footprint wall sections and an expandable movable wall-door, with the expandable movable wall-door movable from an aircraft lavatory first footprint closed position to an aircraft lavatory first footprint open position. The expandable movable wall-door (referred to equivalently herein as a "movable wall-door" or a "wall-door") includes a movable wall-door interior, a movable wall-door exterior, and at least one expandable door panel (equivalently referred to herein as an "expandable wall-door panel"), with the expandable door panel having a first expandable door panel area in the aircraft lavatory first footprint when the expandable door panel is in an expandable door panel stowed configuration, and with the expandable door panel further having a second expandable door panel area in the aircraft lavatory second footprint when the expandable door panel is in an expandable door panel deployed configuration. The expandable aircraft lavatory further includes an aircraft lavatory second footprint when the expandable aircraft lavatory is in an expanded aircraft lavatory configuration, with the aircraft lavatory second footprint having a aircraft lavatory second footprint area, with the aircraft lavatory second footprint bounded by at least three aircraft lavatory second footprint wall sections and the movable expandable wall-door in a door configuration, with the movable expandable wall-door movable and extended through a range of motion from an aircraft lavatory first footprint closed position (with the movable expandable wall door configured as a "wall") to an aircraft lavatory second footprint closed position (with the movable expandable wall-door configured as a "door").

According to a further aspect, the aircraft lavatory second footprint area is greater than the aircraft lavatory first footprint area, and wherein, in the unexpanded aircraft lavatory configuration and in the aircraft lavatory first footprint, the movable expandable wall-door in the aircraft lavatory first footprint closed position is configured to abut at least one of an attendant area, an aircraft door entry area (referred to equivalently herein as an aircraft door passenger entry/egress area), and further abut a full height monument.

In another aspect, in the unexpanded aircraft lavatory configuration and in the aircraft lavatory first footprint, the movable expandable wall-door in the aircraft lavatory first footprint closed position is configured to abut at least one of an attendant area and an aircraft door entry area, and further does not impede entry into the aircraft door entry area.

In a further aspect, in the expanded aircraft lavatory configuration and in the aircraft lavatory second footprint, the movable expandable wall-door in the aircraft lavatory second footprint closed position is configured to abut an aircraft aisle.

In a further aspect, in the expanded aircraft lavatory configuration and in the second aircraft lavatory second footprint, the movable expandable wall-door in the aircraft lavatory second footprint closed position is further configured to impede access to at least one of an attendant area and an aircraft door entry area.

In a further aspect, the expanded aircraft lavatory configuration comprises at least one attendant seat within the aircraft lavatory second footprint.

In a further aspect, the movable door panel associated with or otherwise in communication with the movable expandable wall-door can be hinged and can otherwise fold (e.g., stow) and unfold (e.g., deploy) to alter the overall dimension and area of the movable expandable wall-door.

In another aspect, the aircraft lavatory second footprint in the expanded aircraft lavatory configuration is configured to comprise one or more attendant seat within the aircraft lavatory second footprint.

In a further aspect, the movable expandable wall-door comprises a movable expandable wall-door width able to accommodate a wheelchair.

In another aspect, the aircraft lavatory first footprint area is bounded in an engageable configuration by at least three fixed first lavatory wall panels and the movable expandable wall-door, said movable expandable wall-door comprising the wall-door panel in a stowed and unexpanded configuration.

In a further aspect, the expanded aircraft lavatory configuration comprises at least one attendant seat mounted to a wall within the expanded aircraft lavatory configuration in the aircraft lavatory second footprint.

In another aspect, the expanded aircraft lavatory configuration comprises a plurality of attendant seats mounted to a wall within the expanded aircraft lavatory configuration in the aircraft lavatory second footprint.

In another aspect, the expanded aircraft lavatory configuration further comprises at least one attendant seat in communication with the movable expandable wall-door exterior.

In another aspect, the aircraft lavatory second footprint further includes at least one deployable retractable barrier wall, with the at least one retractable barrier wall positioned proximate to an aircraft door bustle of an aircraft door interior when the expandable aircraft lavatory is in the expanded aircraft lavatory configuration (aircraft lavatory second footprint), with the at least one retractable wall configured to engage at least two of the aircraft lavatory second footprint wall sections.

In another aspect, the at least one retractable barrier wall is configured to be one of the at least three aircraft lavatory second footprint wall sections.

In another aspect, the at least one retractable barrier wall section is configured to deploy automatically in response to a signal from a processor received by a controller in communication with the at least one retractable barrier wall, said signal sent from a transmitter, said transmitter in communication with the movable door, said signal indicating that the aircraft lavatory second footprint has been established and further indicating that the movable door is in a closed position to form the expandable aircraft lavatory is in the expanded aircraft lavatory configuration.

In a further aspect, an aircraft is disclosed, with the aircraft including an expandable aircraft lavatory, with the expandable aircraft lavatory including an expandable aircraft lavatory first footprint when the expandable aircraft lavatory is in an unexpanded aircraft lavatory configuration, with the aircraft lavatory first footprint having an aircraft lavatory first footprint area. The aircraft lavatory first footprint is bounded by at least three aircraft lavatory first footprint wall sections and a movable expandable wall-door, with the movable expandable wall-door movable from an aircraft lavatory first footprint closed position to an aircraft lavatory first footprint open position. The movable expandable wall-door includes a movable expandable wall-door interior, a movable expandable wall-door exterior, and at least one expandable door panel, with the expandable door panel having a first expandable door panel area in the aircraft lavatory first footprint when the expandable door panel is in an expandable door panel stowed configuration, and with the expandable door panel further having a second expandable door panel area in the aircraft lavatory second footprint when the expandable door panel is in an expanded door panel deployed configuration. The expandable aircraft lavatory further includes an aircraft lavatory second footprint when the expandable aircraft lavatory is in an expanded aircraft lavatory configuration, with the aircraft lavatory second footprint having a aircraft lavatory second footprint area, with the aircraft lavatory second footprint bounded by at least three aircraft lavatory second footprint wall sections and the movable expanded wall-door, with the movable expanded wall-door movable and extended through a range of motion from an aircraft lavatory first footprint closed position to an aircraft lavatory second footprint closed position.

According to a further aspect, the aircraft lavatory second footprint area is greater than the aircraft lavatory first footprint area, and wherein, in the unexpanded aircraft lavatory configuration and in the aircraft lavatory first footprint, the movable expandable wall-door in the aircraft lavatory first footprint closed position is configured to abut at least one of an attendant area and an aircraft door entry area within the aircraft cabin.

In another present aspect, a method is disclosed for converting an aircraft lavatory dimension from a first dimension to a second converted dimension, the method including altering an aircraft lavatory dimension from an aircraft lavatory first footprint having an aircraft lavatory first footprint area to an aircraft lavatory second footprint having an aircraft lavatory second footprint area, with the aircraft lavatory first footprint bounded by at least three aircraft lavatory first footprint wall sections, with at least two aircraft lavatory first footprint wall sections in communication with a movable lavatory wall-door, and with the aircraft lavatory second footprint bounded by at least three aircraft lavatory second footprint wall sections, with one of the at least three aircraft lavatory second footprint wall sections located immediately adjacent to and parallel to an aircraft door bustle, with the movable expandable wall-door including at least one expandable door panel, with the expandable door panel having a first unexpanded door panel area in a stowed door panel configuration in the aircraft lavatory first footprint, and with the expandable door panel having a second expanded door panel area in a deployed door panel configuration in the aircraft lavatory second footprint. The method further includes disengaging the movable expandable lavatory wall-door from at least one aircraft lavatory first footprint wall section, engaging the movable expandable lavatory wall-door with at least one aircraft lavatory second footprint wall section, deploying the expandable door panel from the first unexpanded door panel area in a stowed and unexpanded state to the second expanded door panel area in a deployed and expanded state; and converting the aircraft lavatory first footprint into the aircraft lavatory second footprint.

In another aspect, the method further includes, increasing the aircraft lavatory dimension from the aircraft lavatory first footprint area to the aircraft lavatory second footprint area, and wherein the aircraft lavatory second footprint area is greater than the aircraft lavatory first footprint area.

In another aspect, the method further includes, incorporating at least one of a portion of attendant area or an aircraft door entry area into the aircraft lavatory second footprint area.

In another aspect, a method for expanding the dimension of an aircraft lavatory is disclosed, with the method including installing an expandable aircraft lavatory in an aircraft, with the expandable aircraft lavatory including an aircraft lavatory first footprint in an unexpanded aircraft lavatory configuration, with the aircraft lavatory first footprint having an aircraft lavatory first footprint area, with the aircraft lavatory first footprint bounded by at least three aircraft lavatory first footprint wall sections and a movable expandable lavatory wall-door, with the movable expandable lavatory wall-door movable from an aircraft lavatory first footprint closed position to an aircraft lavatory first footprint open position, and with the movable expandable wall-door in a closed position bordering and otherwise adjacent to an unobstructed aircraft door entry area, and with the aircraft door entry area located proximate to an aircraft door. The movable expandable lavatory wall-door includes at least one expandable lavatory door panel, with the expandable lavatory door panel having a first expandable lavatory door panel area in the aircraft lavatory first footprint in a stowed door panel configuration, with the expandable lavatory door panel having a second expanded lavatory door panel area in a deployed and expanded lavatory door panel configuration. The expandable aircraft lavatory further includes an aircraft lavatory second footprint in an expanded aircraft lavatory configuration, with the aircraft lavatory second footprint having an aircraft lavatory second footprint area, with the aircraft lavatory second footprint bounded by at least three aircraft lavatory second footprint wall sections and the movable expandable wall-door in an expanded state, with the movable expandable lavatory wall-door movable through a range of motion from an aircraft lavatory first footprint closed position (in an unexpanded state) to an aircraft lavatory second footprint closed position (in an expanded state). According to a present aspect, the aircraft lavatory second footprint and second footprint area is greater than the aircraft lavatory first footprint and first footprint area. According to a further present aspect, in the unexpanded aircraft lavatory configuration and in the aircraft lavatory first footprint, the movable expandable lavatory wall-door in the aircraft lavatory first footprint closed position is configured to abut at least one of an attendant area and an aircraft door entry area. In a further present aspect, in the expanded aircraft lavatory configuration and in the second aircraft lavatory footprint, the movable and expanded lavatory wall-door in the second aircraft lavatory footprint closed position is configured to abut an aircraft aisle and is further configured to impede access to at least one of an attendant area and an aircraft door entry area, and wherein in the expanded aircraft lavatory configuration, the second aircraft lavatory footprint for the expanded aircraft lavatory configuration comprises at least one attendant seat within the second aircraft lavatory footprint.

In a further aspect, the aircraft lavatory second footprint further includes at least one retractable barrier wall, with at least one retractable barrier wall positioned proximate to an aircraft door bustle or an aircraft door interior when the expandable aircraft lavatory is in the expanded aircraft lavatory configuration, and with the at least one retractable wall configured to engage at least two aircraft lavatory footprint second wall sections.

In another aspect, the at least one retractable barrier wall is configured to be one of the at least three aircraft lavatory second footprint wall sections.

In a further aspect, the method further includes incorporating a portion of the aircraft door entry area into the aircraft lavatory second footprint in the expanded lavatory configuration.

The features, functions and advantages that have been discussed can be achieved independently in various aspects or may be combined in yet other aspects, further details of which can be seen with reference to the following description and the drawings.

BRIEF DESCRIPTION OF THE DRAWINGS

Figure 1:
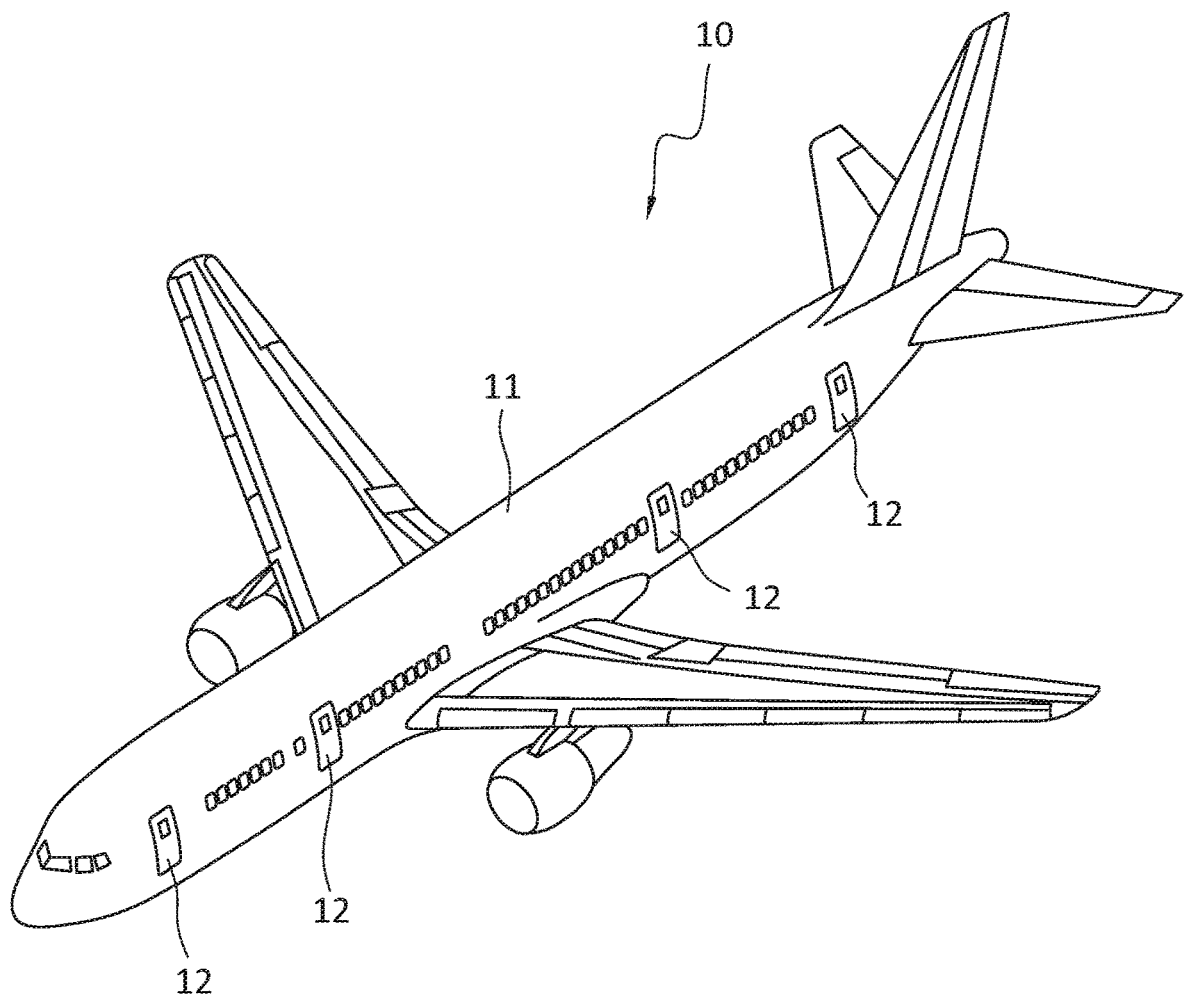
Figure 2:
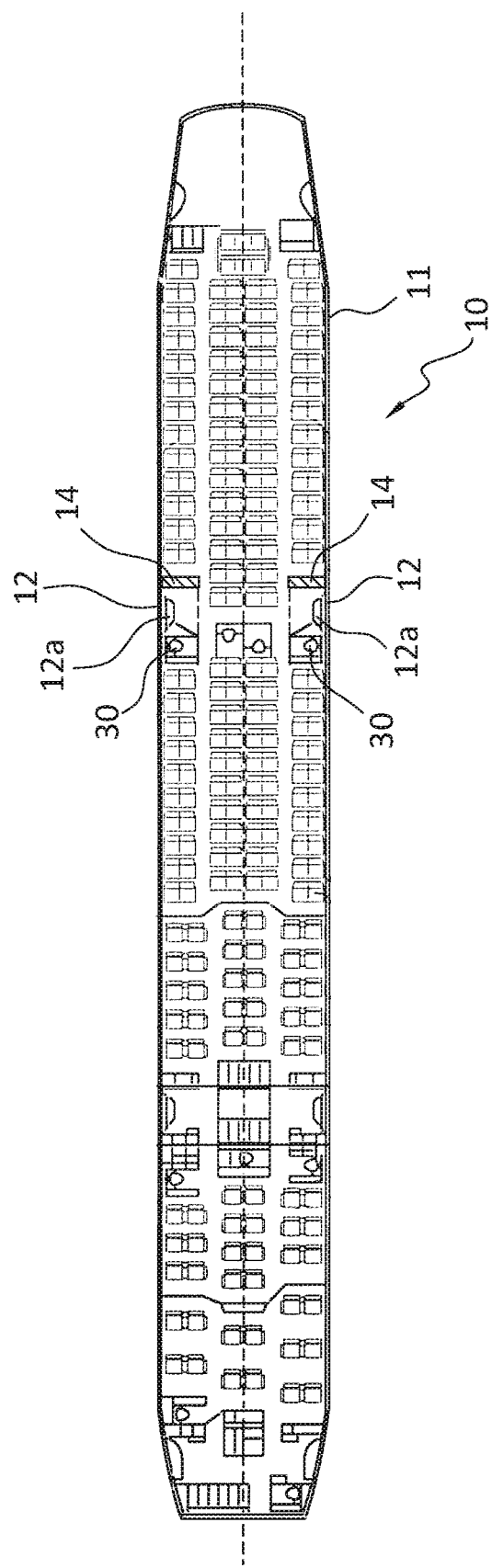
Figure 3:
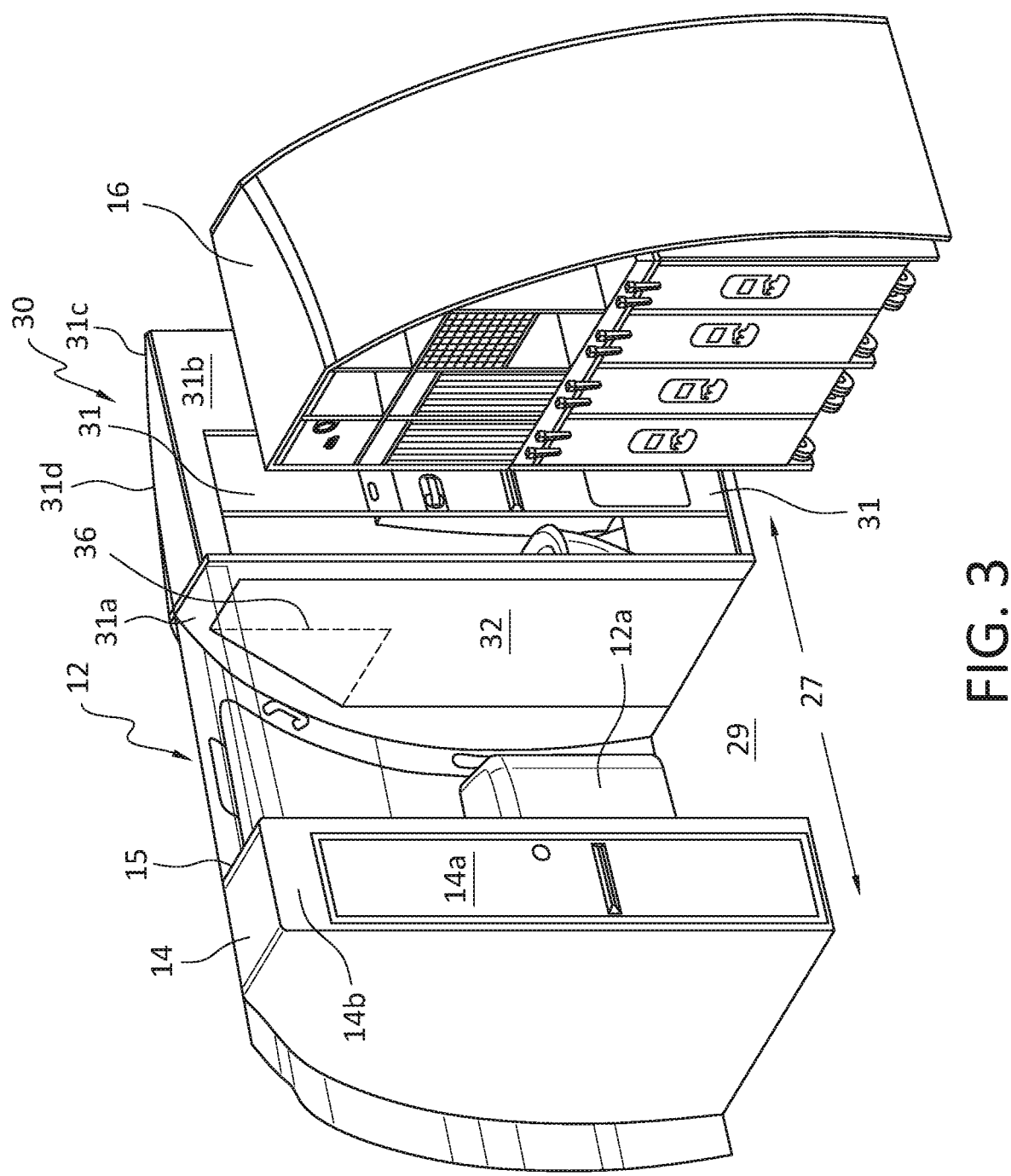
Figure 4:
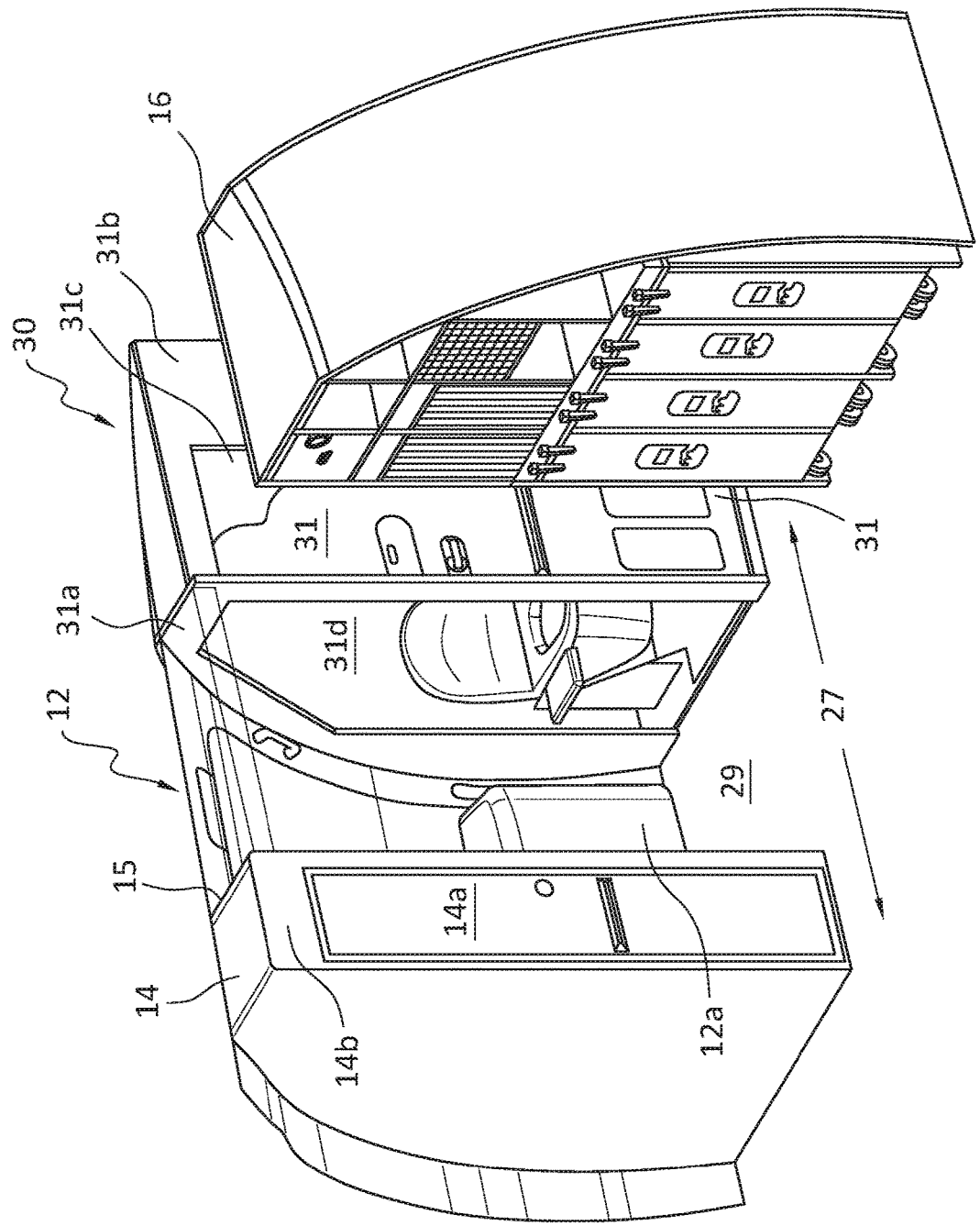
Figure 5:
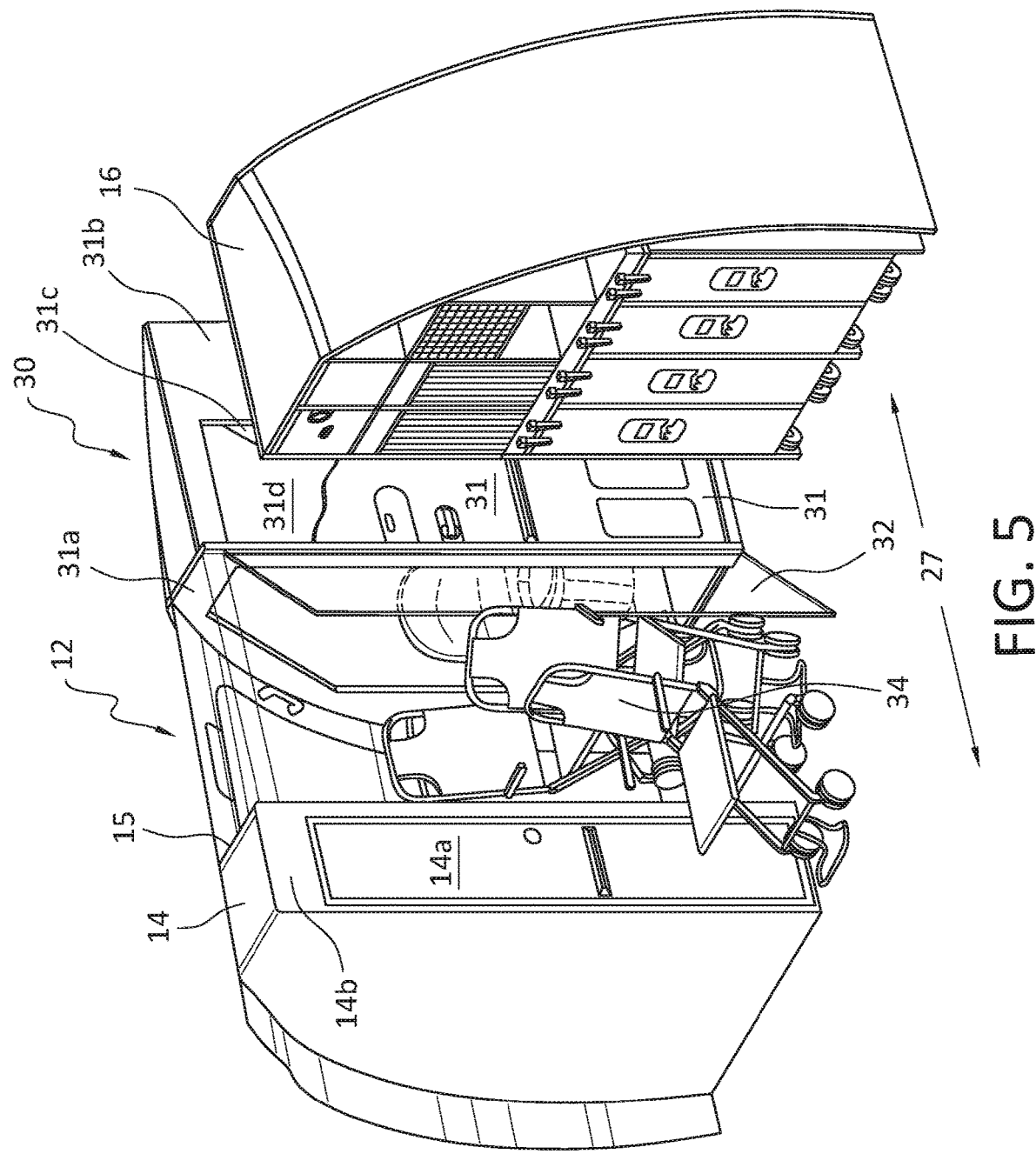
Figure 6:
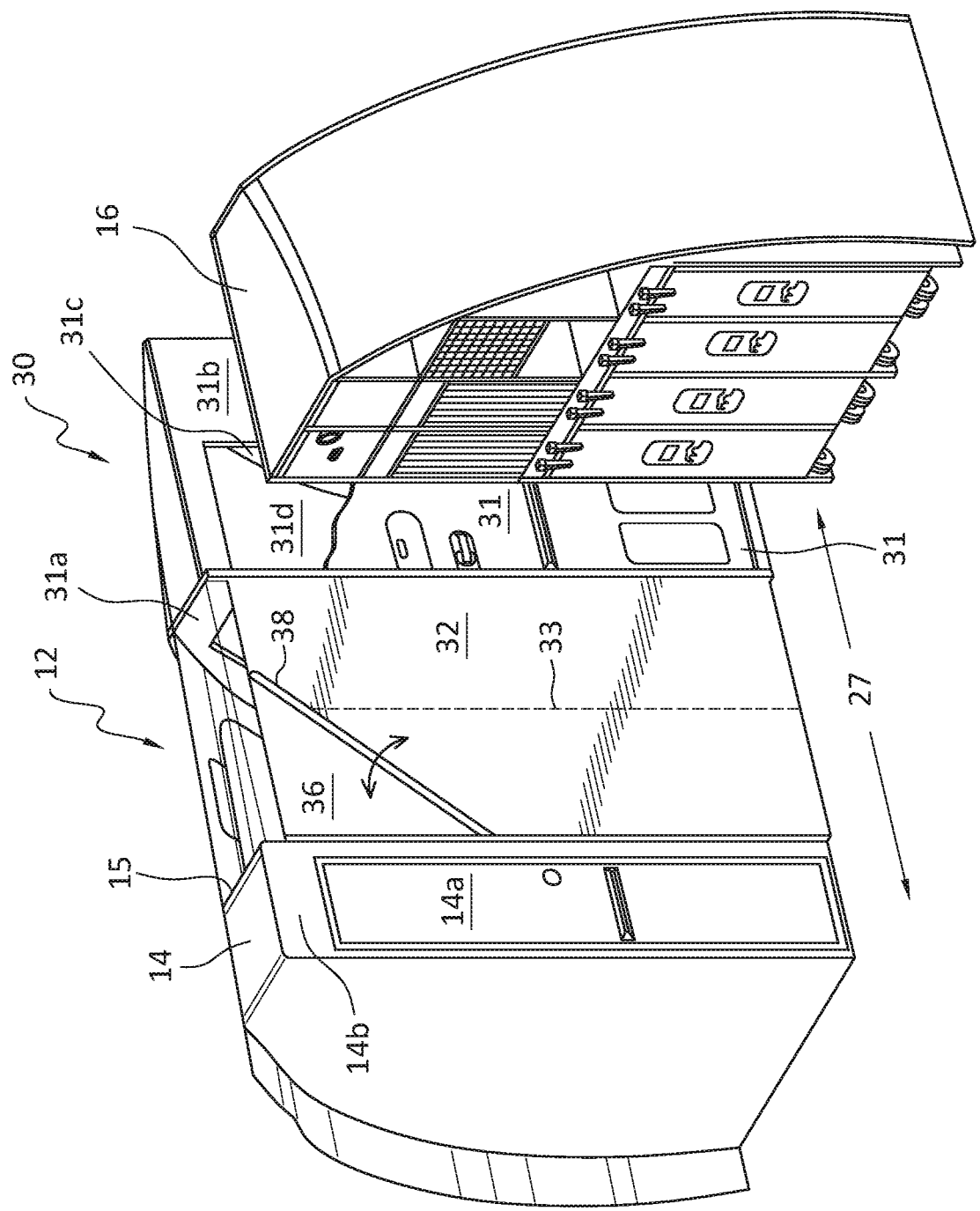
Figure 7:
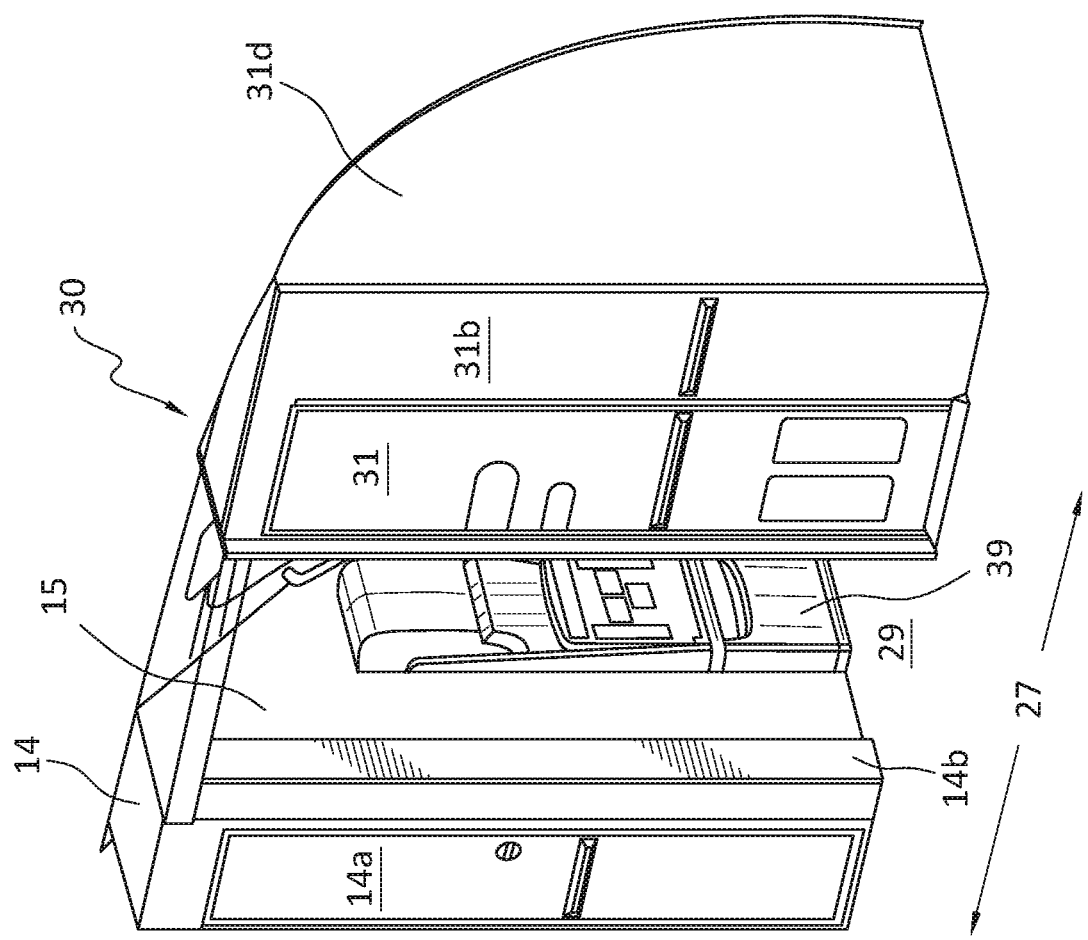
Figure 8:
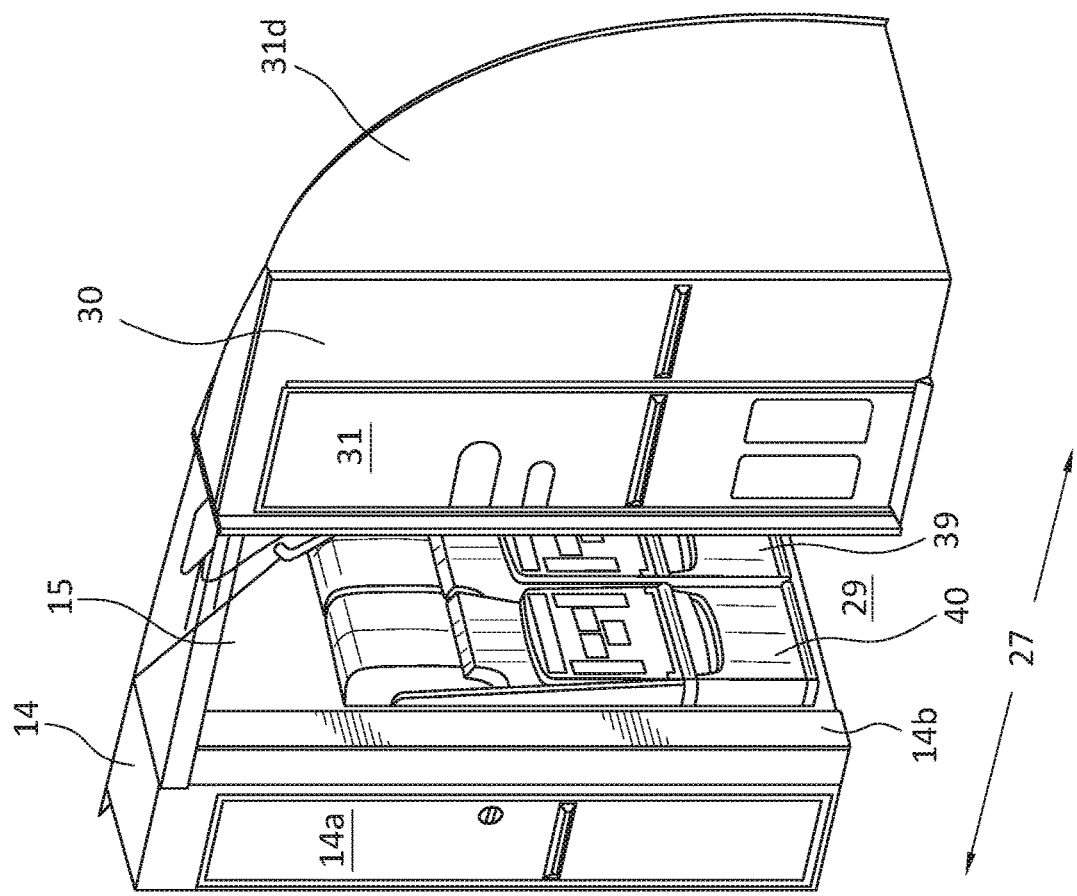
Figure 9B:
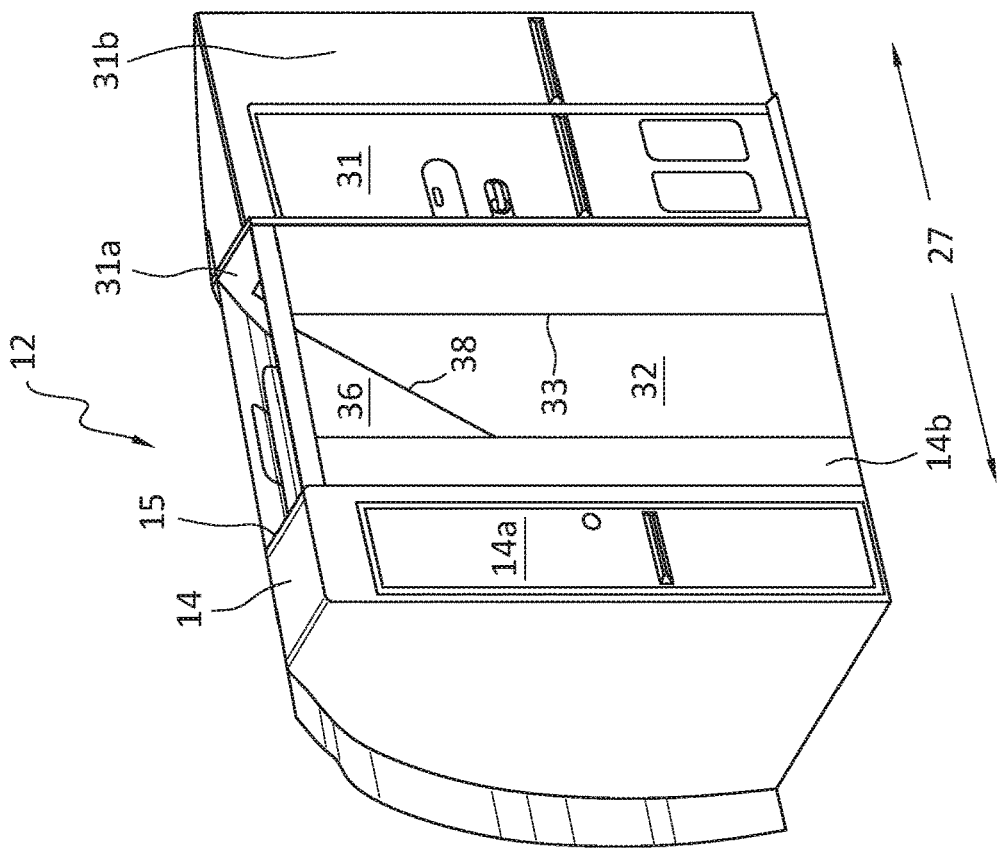
Figure 9A:
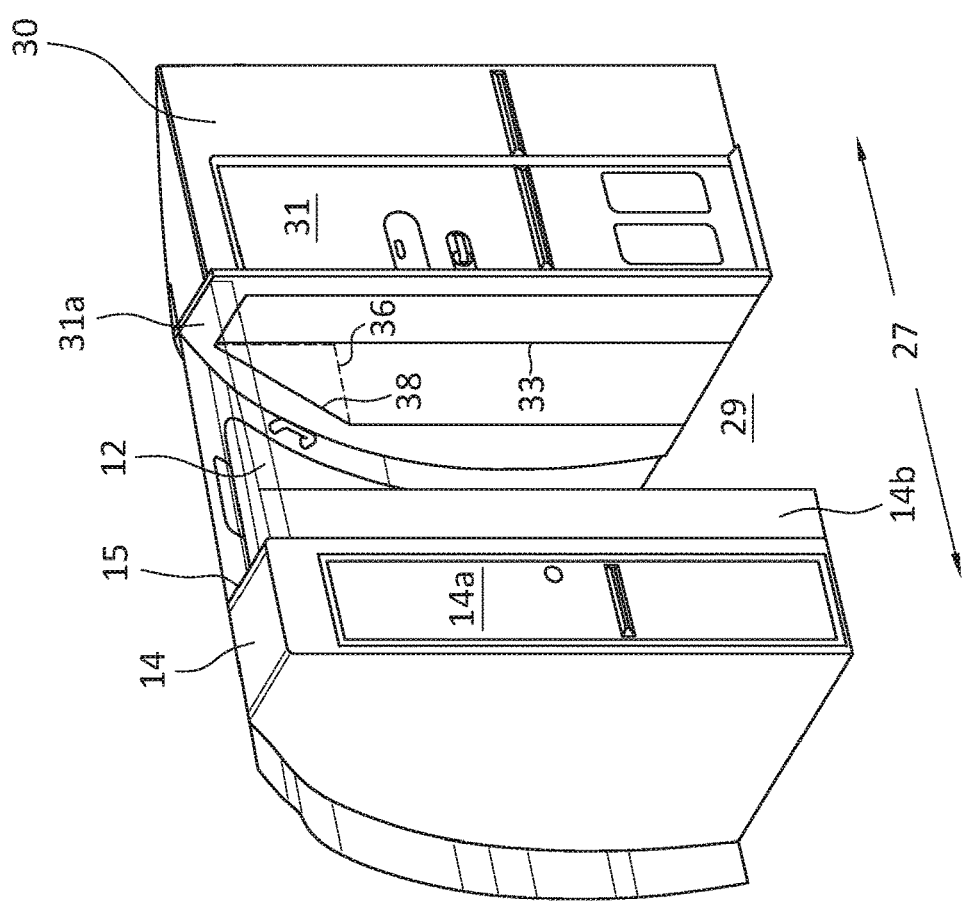
Figure 11:
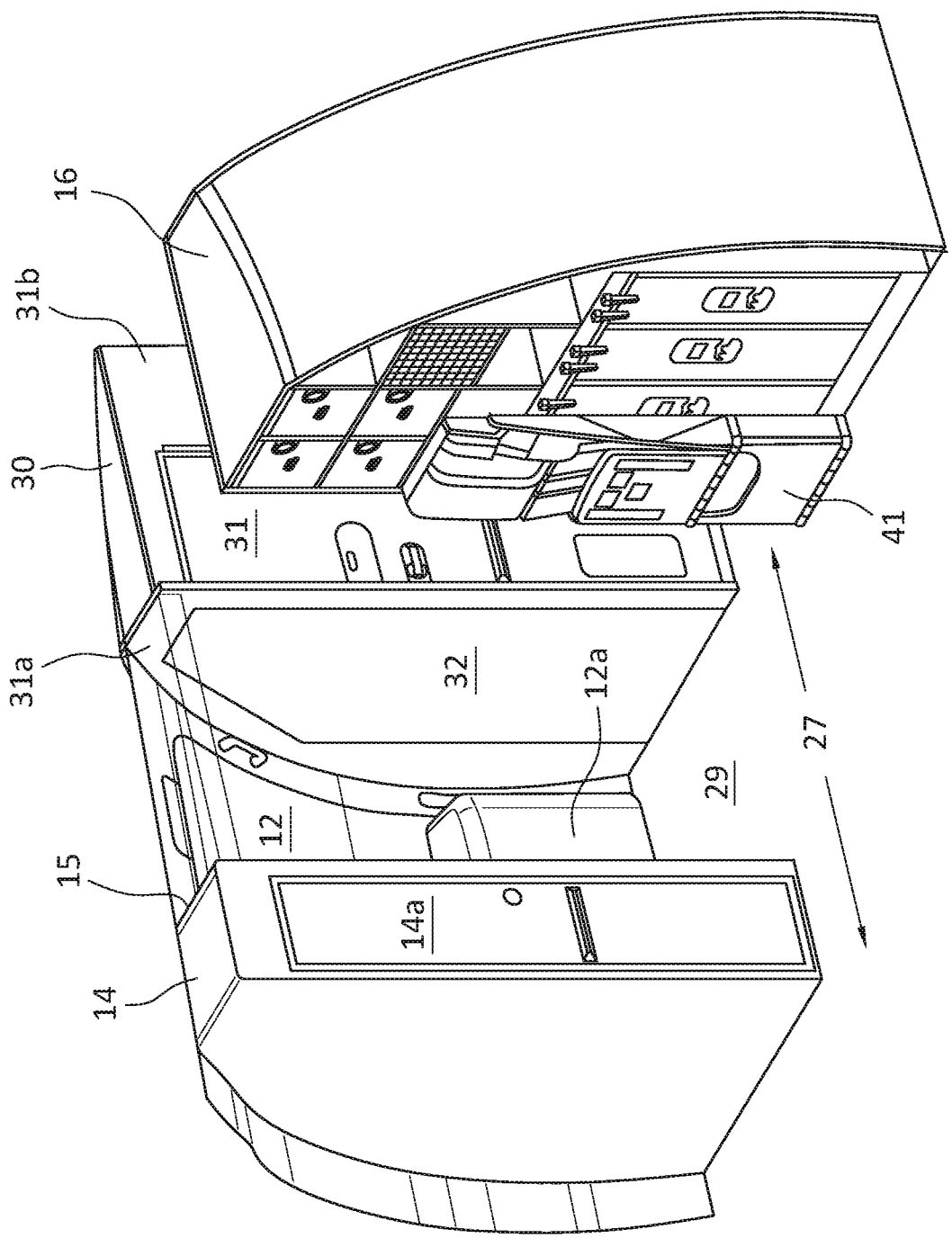
Figure 12A:
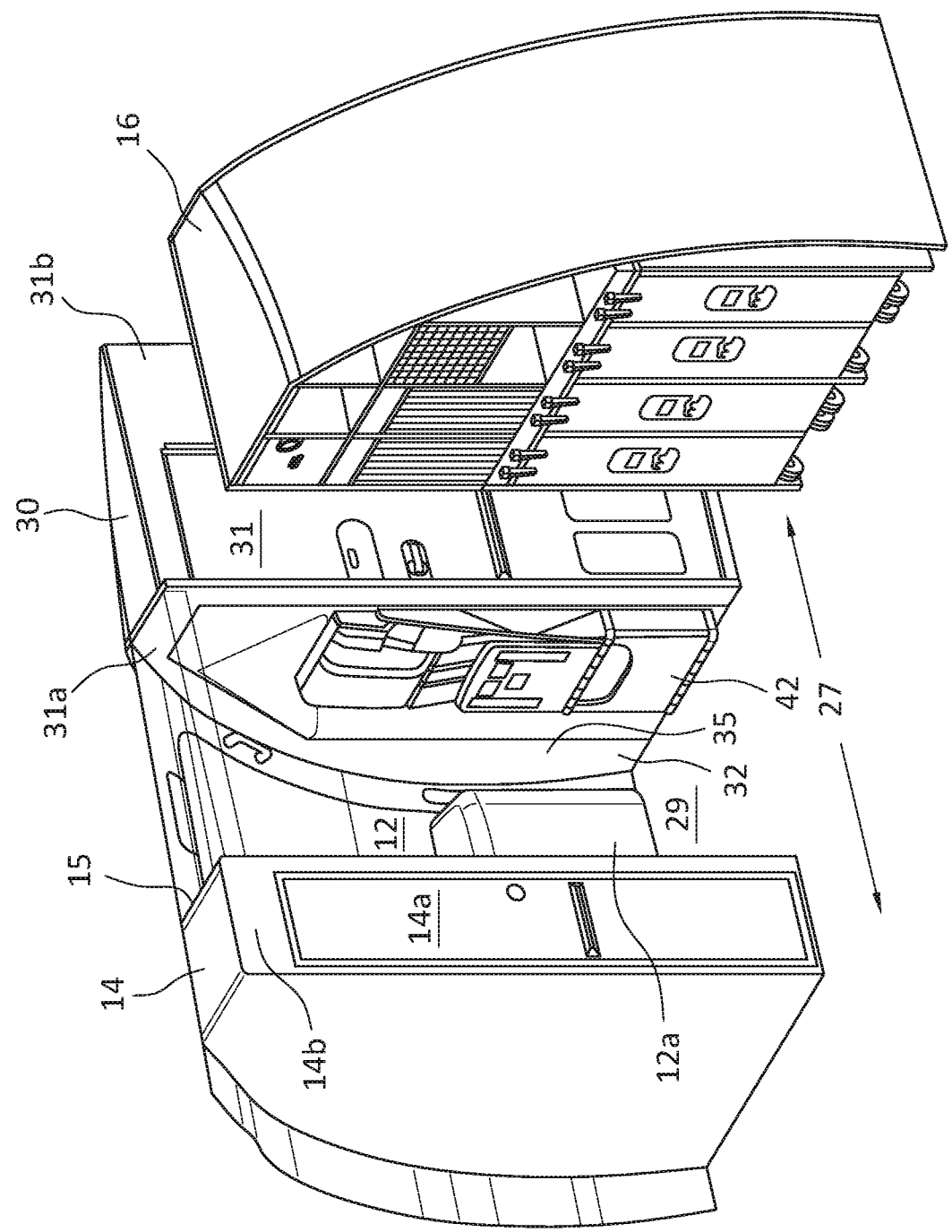
Figure 12B:
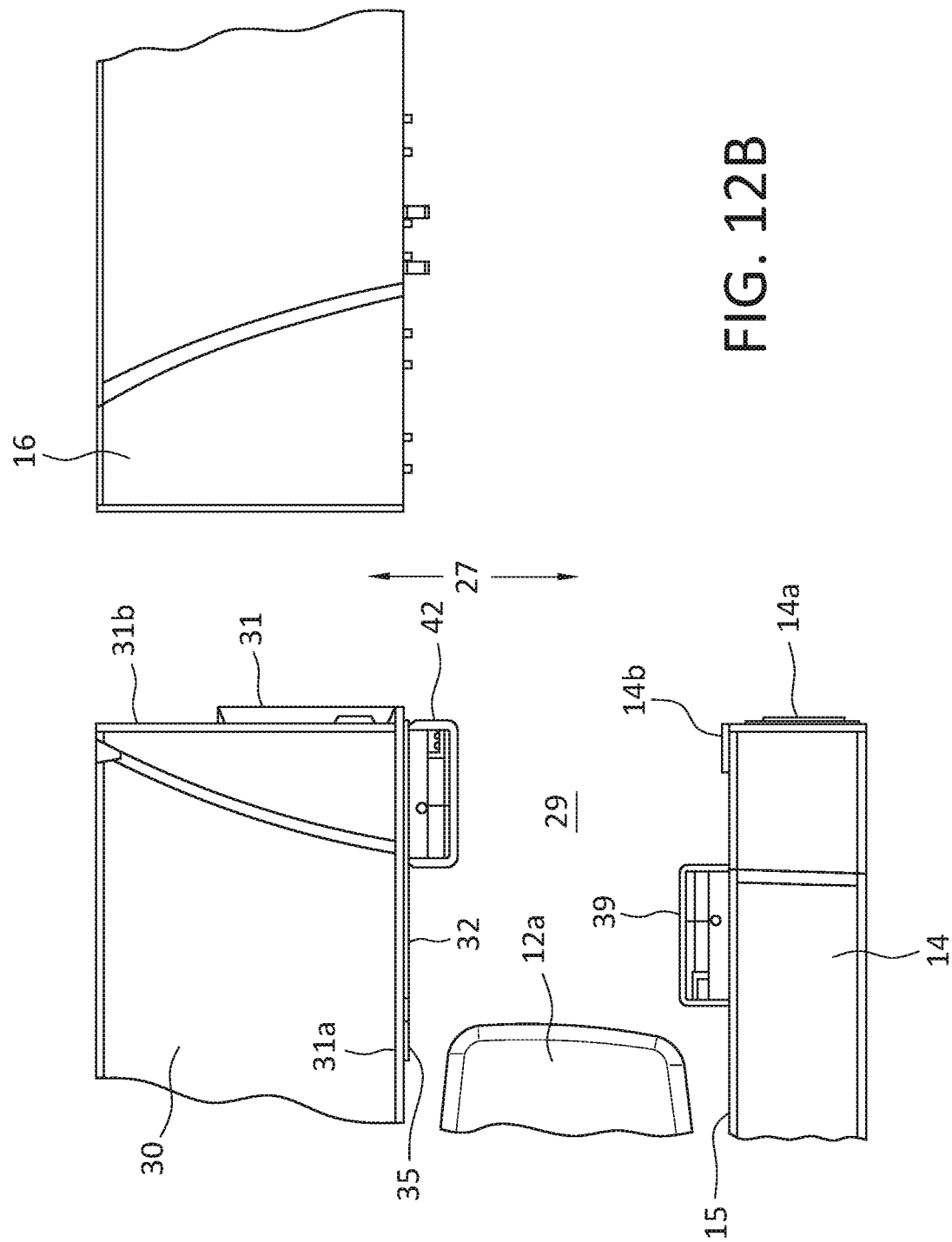
Figure 12C:
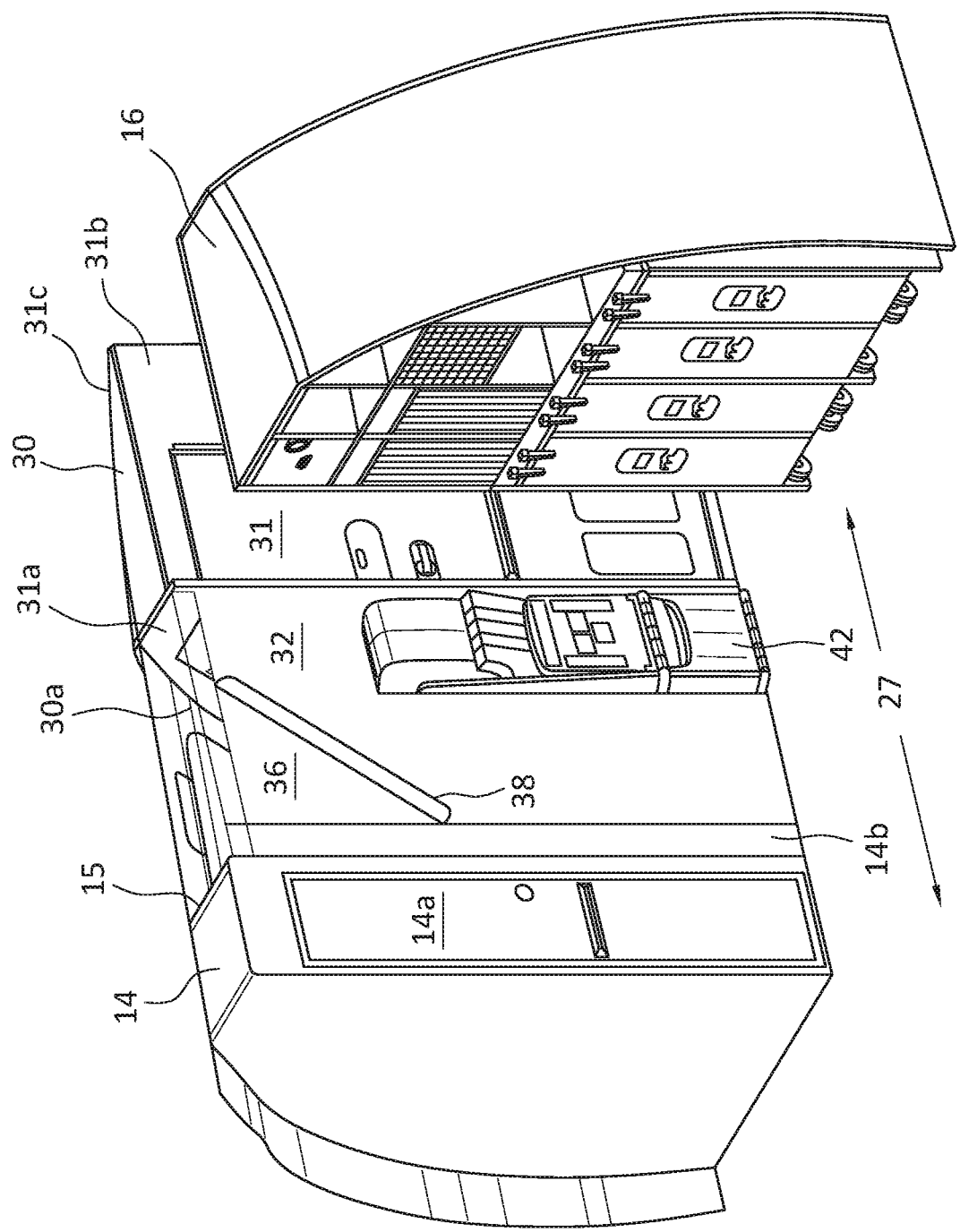
Figure 12D:
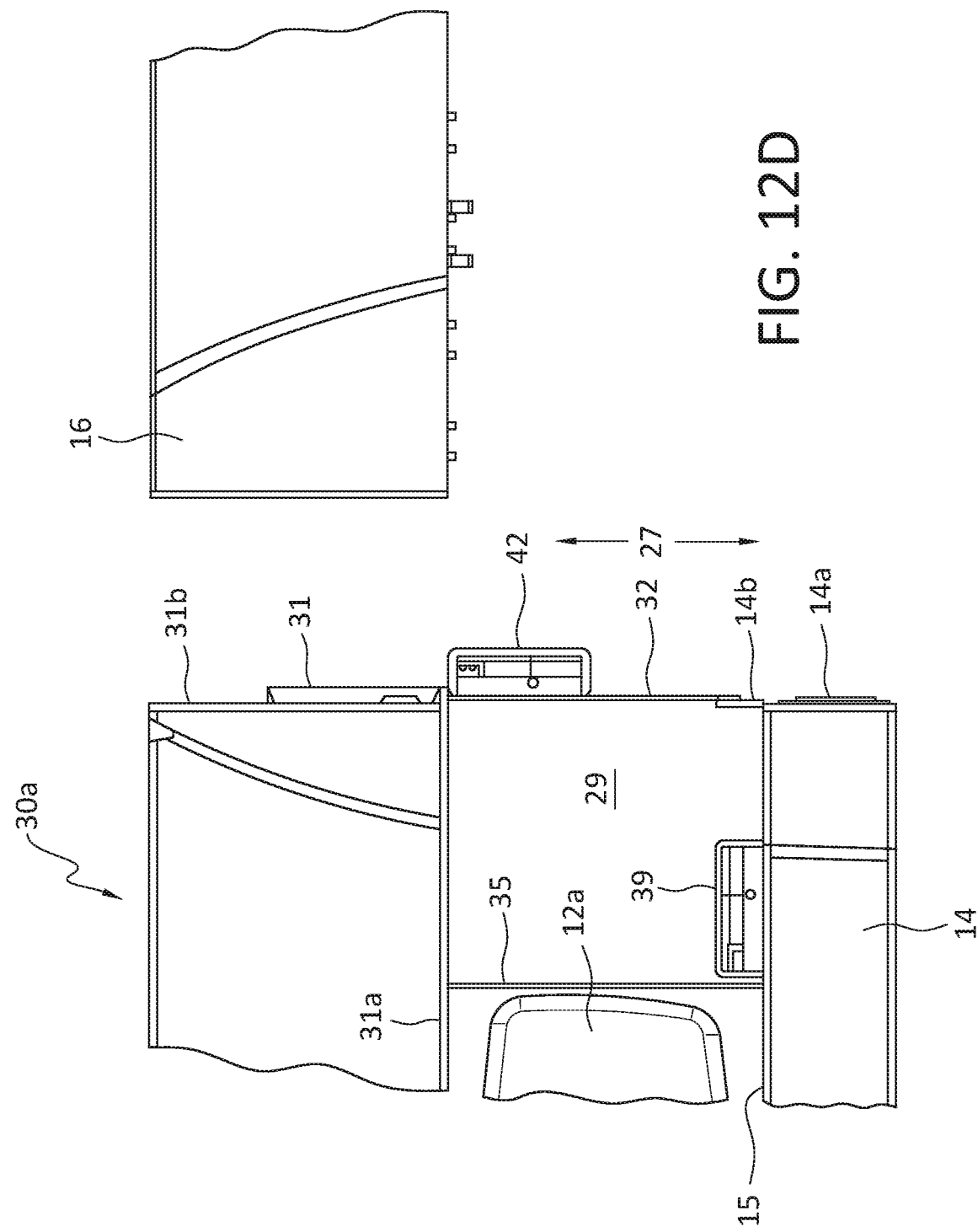
Figure 14:
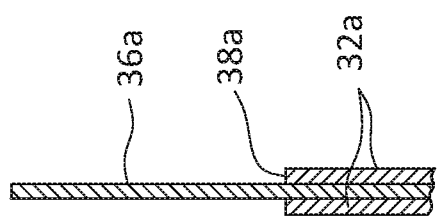
Figure 13:
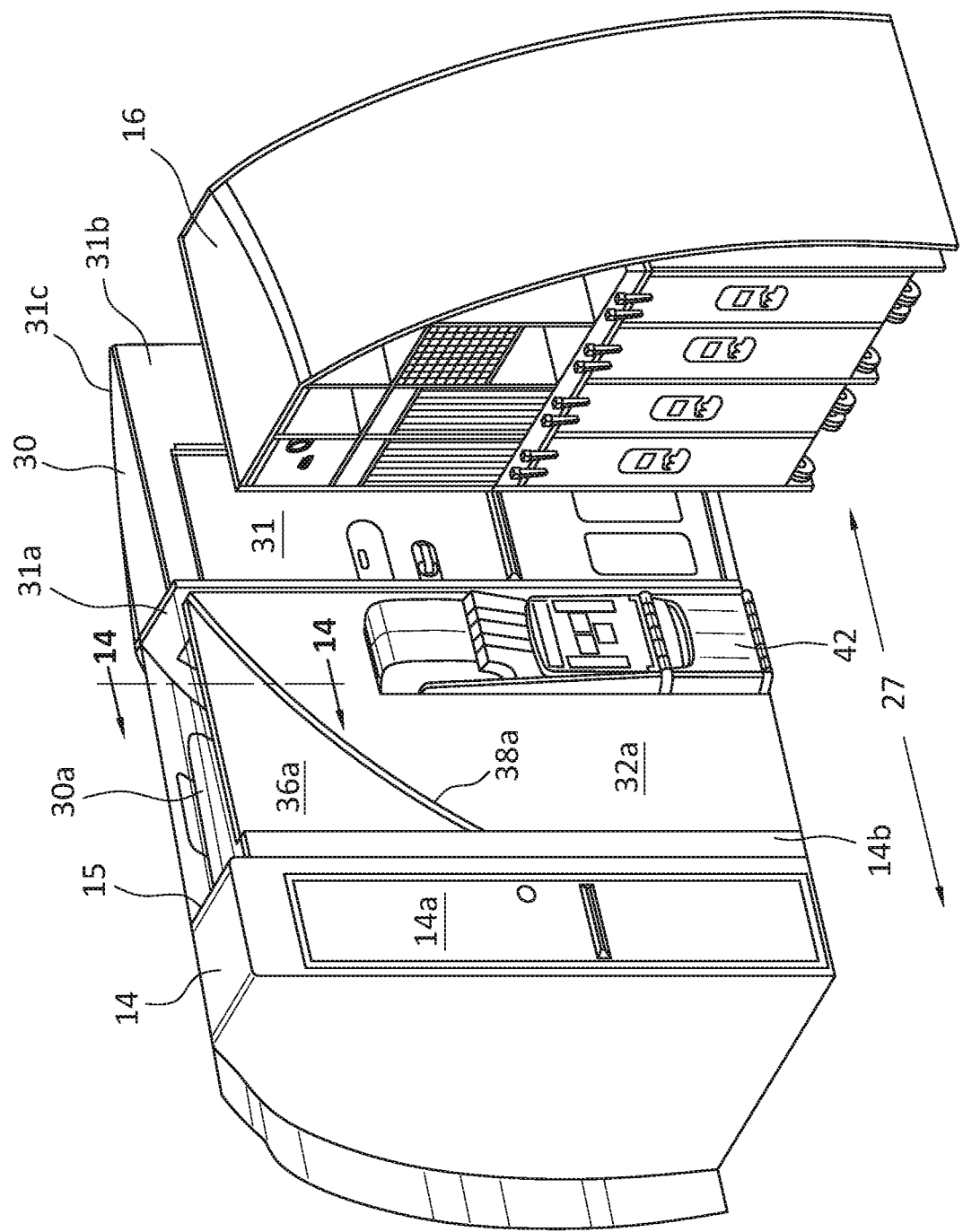
Figure 15:
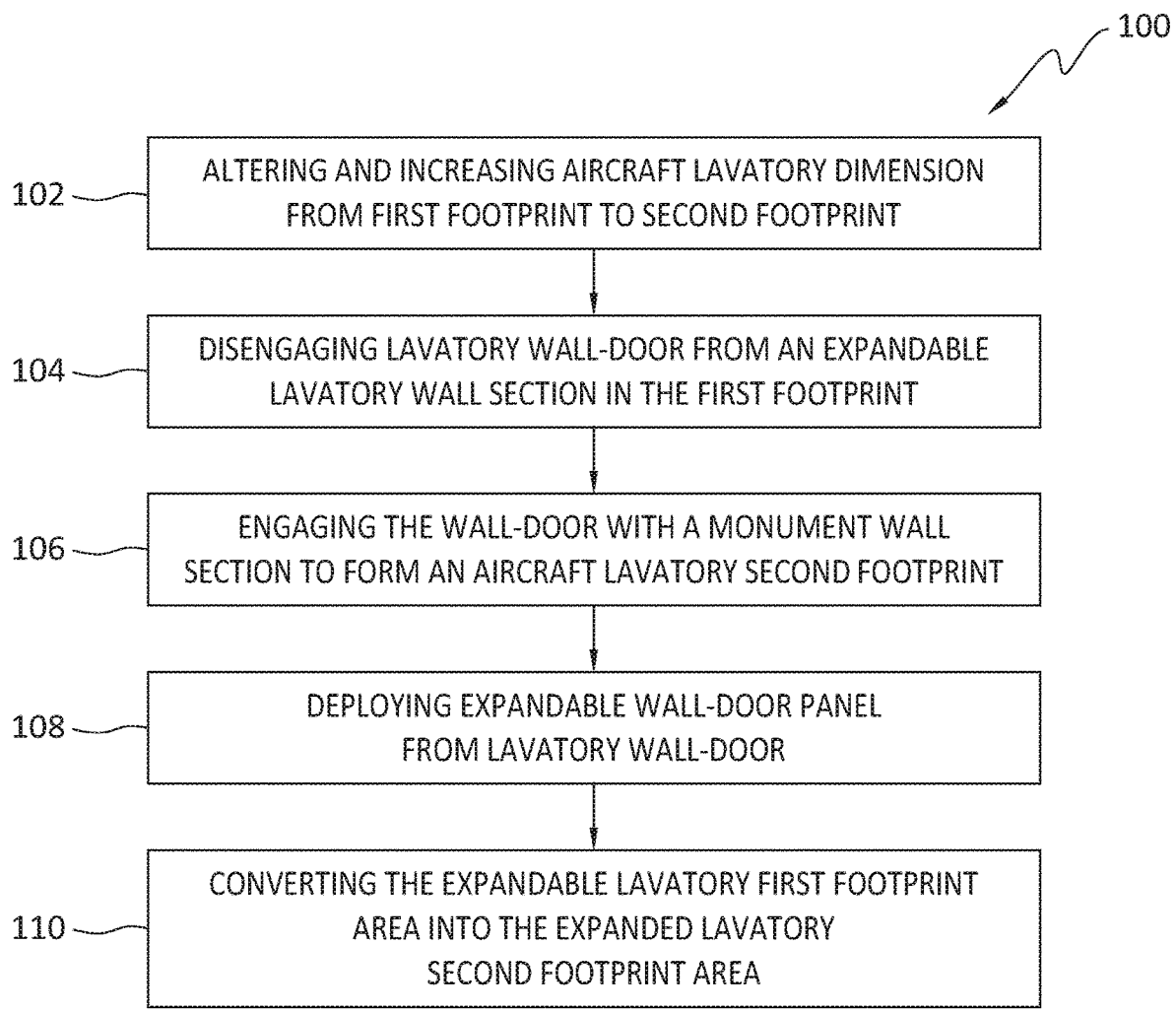
Figure 16:
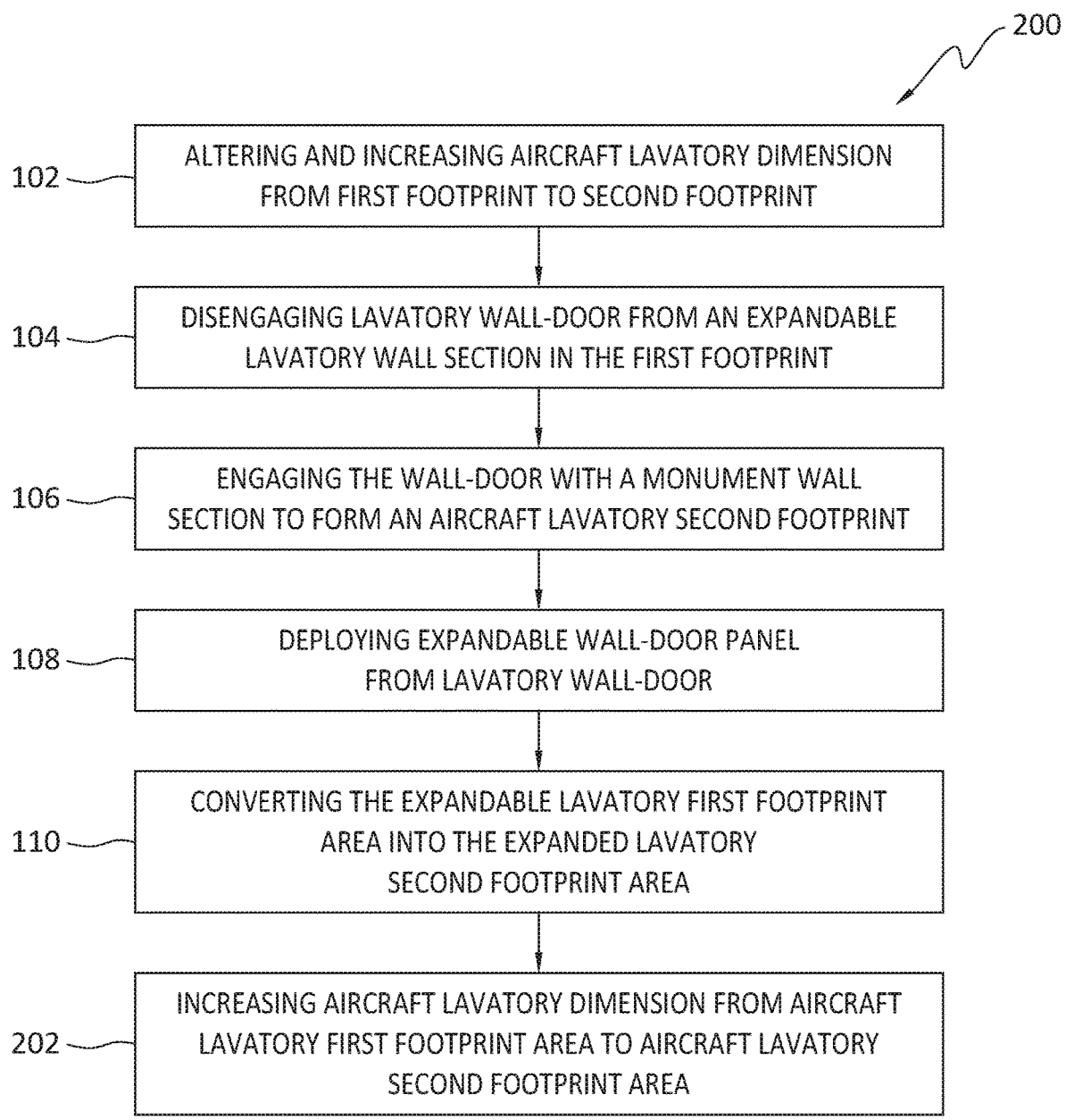
Figure 17:
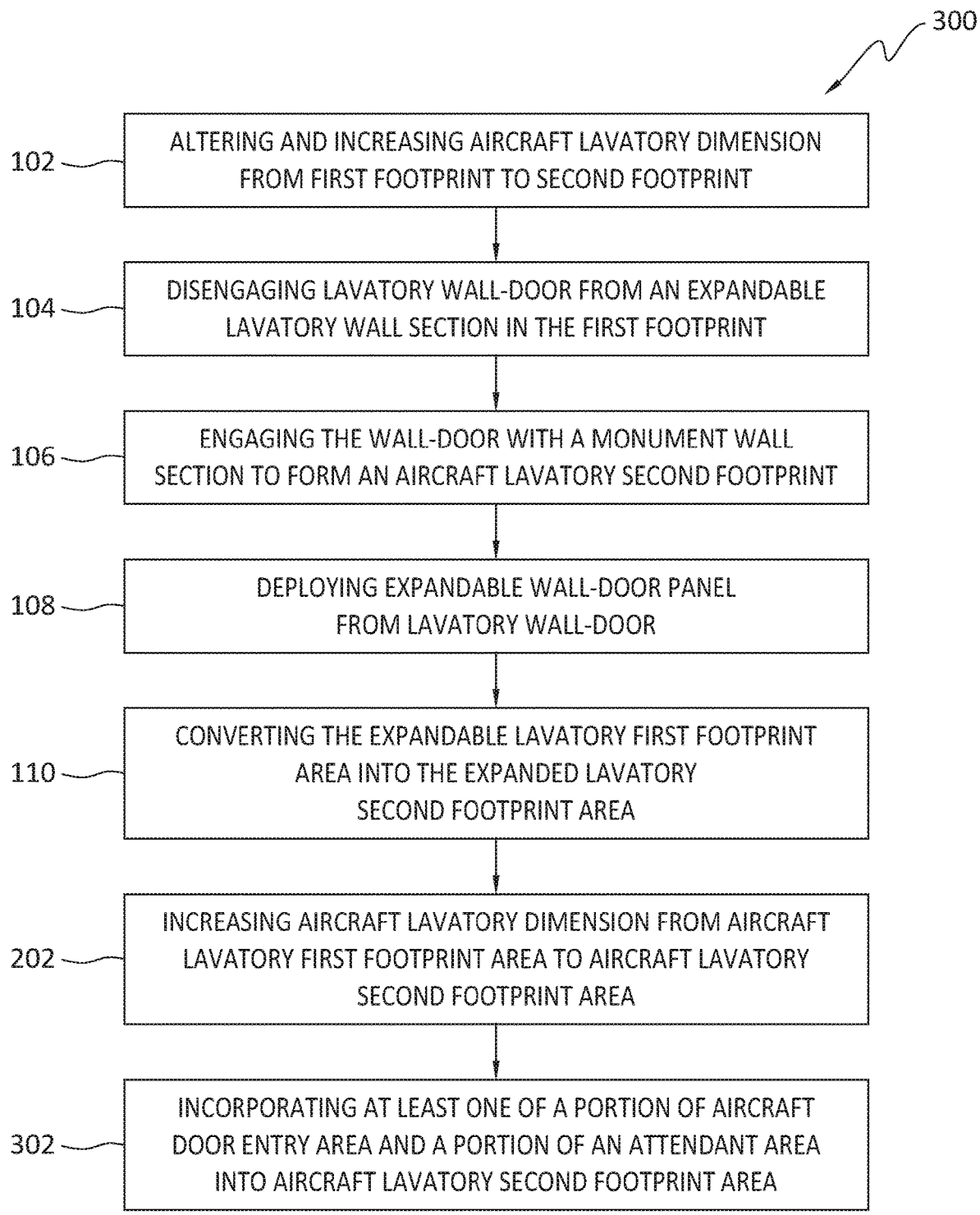

Having thus described variations of the disclosure in general terms, reference will now be made to the accompanying drawings, which are not necessarily drawn to scale, and wherein:

FIG. 1 is an illustration of a perspective view of a vehicle in the form of an aircraft, according to present aspects;

FIG. 2 is a cross-sectional overhead plan view of an aircraft of the type shown in FIG. 1, according to present aspects;

FIG. 3 is an illustration of an aircraft cabin region of the type shown in FIGS. 1 and/or 2, showing an expandable lavatory, according to present aspects;

FIG. 4 is a partially exposed view of an expandable lavatory, according to present aspects;

FIG. 5 is a partially exposed view of an expanded lavatory, according to present aspects;

FIG. 6 is a partially exposed view of an expanded lavatory, according to present aspects;

FIG. 7 is a perspective view of an expandable lavatory, according to present aspects;

FIG. 8 is a perspective view of an expandable lavatory, according to present aspects;

FIG. 9A is a perspective view of an expandable lavatory, according to present aspects;

FIG. 9B is a perspective view of an expanded lavatory, according to present aspects;

FIG. 10A is an overhead plan view of an expandable lavatory, according to present aspects;

FIG. 10A is an overhead plan view of an expandable lavatory being converted into an expanded lavatory, according to present aspects;

FIG. 10B is an overhead plan view of an expandable lavatory being converted into an expanded lavatory, according to present aspects;

FIG. 10C is an overhead plan view of an expanded lavatory, according to present aspects;

FIG. 11 is a perspective view of an expandable lavatory, according to present aspects;

FIG. 12A is a perspective view of an expandable lavatory, according to present aspects;

FIG. 12B is an overhead plan view of the expandable lavatory shown in FIG. 12A, and according to present aspects FIG. 12C is a perspective view of an expanded lavatory, according to present aspects;

FIG. 12D is an overhead plan view of the expanded lavatory shown in FIG. 12C, and according to present aspects;

FIG. 13 is a perspective view of an expanded lavatory, according to present aspects;

FIG. 14 is an enlarged, cross-sectional side view of an expandable pocketed door panel with a nested wall-door panel, according to present aspects;

FIG. 15 is a flowchart outlining a method according to present aspects;

FIG. 16 is a flowchart outlining a method according to present aspects;

FIG. 17 is a flowchart outlining a method according to present aspects; and

Figure 18:
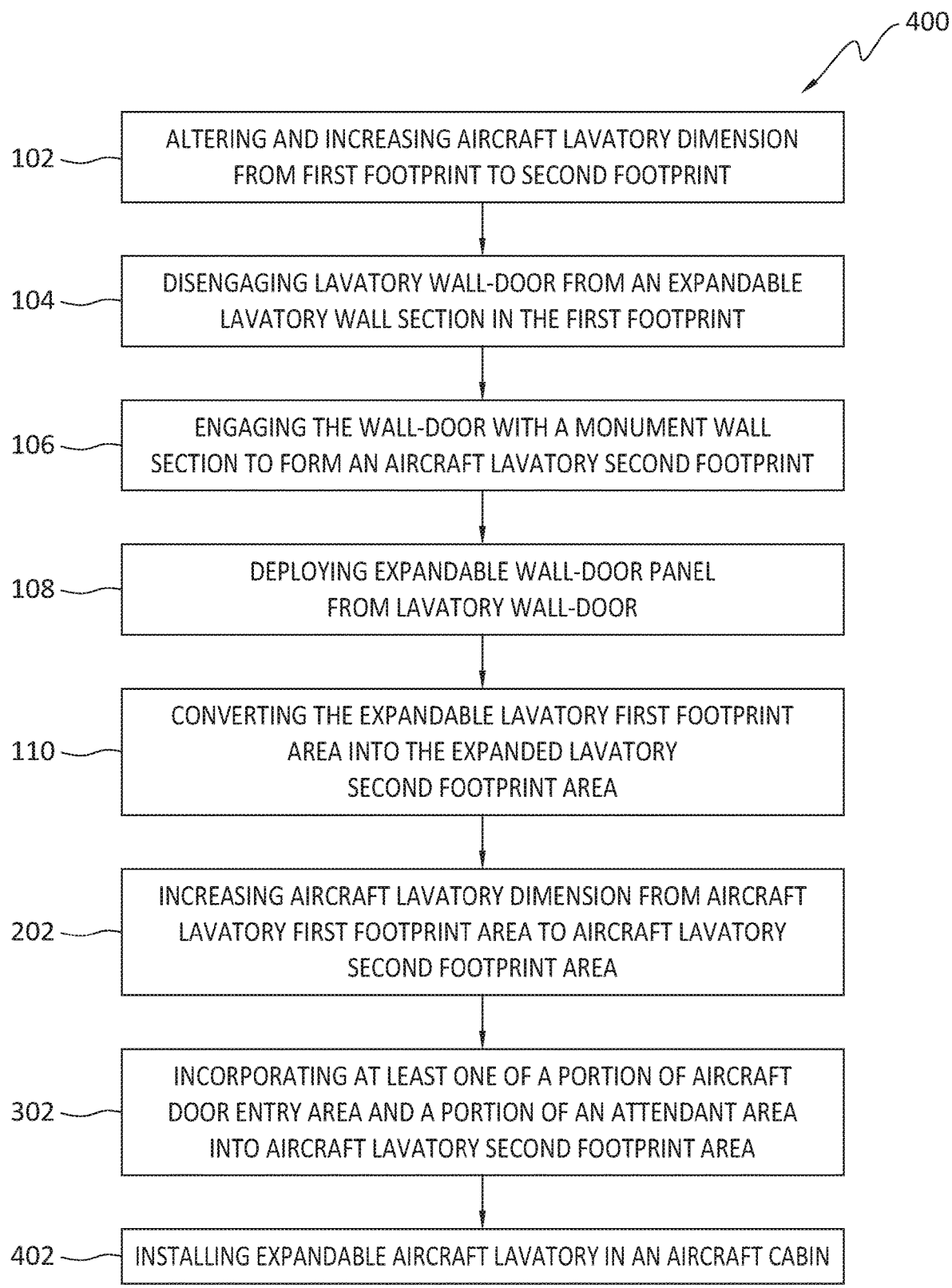

FIG. 18 is a flowchart outlining a method according to present aspects.

DETAILED DESCRIPTION

Presently disclosed aspects are directed to an expandable aircraft lavatory for an aircraft, including, for example, a passenger aircraft, with the expandable aircraft lavatory having an aircraft lavatory first footprint having an aircraft lavatory first footprint area that can be converted into an expanded, larger aircraft lavatory second footprint having an aircraft lavatory second footprint area. According to present aspects, the aircraft lavatory second footprint area is able to facilitate use by a Person of Restricted Mobility (PRM) requiring, for example, a wheelchair accessible lavatory, or otherwise requiring the assistance of another person, etc.

According to present aspects, the expandable aircraft lavatory is convertible and can incorporate otherwise unused space within an aircraft cabin architecture into the expanded aircraft lavatory second footprint including, for example, area that is ordinarily found proximate to, and immediately external of, an existing aircraft lavatory. Such unused space within an aircraft cabin architecture can, for example, include aircraft cabin space that is typically unused during flight, and that can be found adjacent an aircraft door entryway (also referred to equivalently herein as an "aircraft egress area" or an aircraft door egress area").

FIG. 1 is a perspective view of a vehicle in the form of a passenger aircraft 10, with the passenger aircraft 10 including an aircraft fuselage 11 and aircraft doors 12. FIG. 2 shows a representative and non-limiting cross-sectional overhead plan view of a passenger aircraft 10 of the type shown in FIG. 1, and showing a plurality of aircraft cabin sections comprising aircraft seating, aircraft cabin doors 12, aircraft cabin door interior bustles 12a, aircraft cabin monuments 14, and aircraft cabin lavatories 30, with aircraft cabin lavatories 30 of the type located proximate to aircraft cabin doors 12. Aircraft monuments are understood to include structural units that can be, for example, closets, galleys, lavatories, etc. As used herein monuments such as those denoted by in the FIGS. as "monument 14" can include closets, galleys, and cabin structures that further can include close out features and that extend from proximate an aircraft cabin floor to proximate an aircraft cabin ceiling.

According to present aspects, an expandable aircraft lavatory is disclosed that can convert into an expanded aircraft lavatory that greatly improves access for Persons of Restricted Mobility (PRM), with the converted, expanded aircraft lavatory configured to include space within the aircraft cabin that is unused while the aircraft is in flight such as, for example, area adjacent an aircraft door entry.

FIG. 3 shows a perspective, representative non-limiting, and partially exposed view of an expandable aircraft lavatory 30. As shown in FIG. 3, an expandable lavatory 30 is positioned adjacent aircraft cabin aisle 27 and door entry area 29. Expandable lavatory 30 further includes a lavatory door 31 in partially open position. Expandable lavatory 30 is further defined by expandable aircraft lavatory walls 31a, 31b, 31c, and 31d with expandable aircraft lavatory wall 31c only partially visible, and lavatory door 31. Expandable lavatory wall 31d is positioned adjacent the interior of fuselage 11. As further shown in FIG. 3, monument 14 is positioned adjacent aircraft door entry aisle 29 and is further positioned adjacent aircraft cabin aisle 27, with monument 14 spaced a selected distance across the aircraft door entry area from expandable aircraft lavatory 30. The selected distance across the aircraft door entry area is a distance that is at least equal to the width of the aircraft door 12 and the width of the aircraft door interior bustle 12a. Monument 14 includes monument door 14a. and monument wall 14b. According to present aspects, when a lavatory is described herein as "the expandable aircraft lavatory", such expandable aircraft lavatory is understood to be in the "unexpanded state", and having the footprint of, for example, a conventional aircraft lavatory.

As further shown in FIG. 3, expandable aircraft lavatory wall 31a includes a movable expandable wall-door 32 configured to engage expandable aircraft lavatory wall 31a. In the engaged configuration (and in the unexpanded lavatory configuration), expandable aircraft lavatory wall 31a is engaged in a fixed orientation with the movable expandable wall-door 32 to form a single wall structure that forms one of the walls of the expandable aircraft lavatory 30. As further shown in FIG. 3, the interior of the movable expandable wall-door panel 32 comprises a wall-door extendable panel 36 that is shown in FIG. 3 as a substantially triangular, folded panel that is in a folded and "stowed" configuration (e.g., an unextended or non-extended configuration relative to the movable expandable wall-door 32).

FIG. 4 shows a further perspective view of the expandable aircraft lavatory 30 as shown in FIG. 3, with the movable expandable wall-door panel 32 not included in FIG. 4 to further show the interior of the expandable aircraft lavatory 30 and making expandable aircraft lavatory wall 31d more visible in FIG. 4. FIG. 4 further shows lavatory door 31 in the closed position (with a partially exposed view) and with the lavatory door 31 engaged with lavatory walls 31a, 31b, and with lavatory door 31 in the closed position oriented adjacent aircraft cabin aisle 27.

FIG. 5 shows a perspective and partially exposed view of the expandable aircraft lavatory 30 that is similar to the that shown in FIGS. 3 and 4, but now showing movable expandable wall-door 32 in an open position and engaged with expandable aircraft lavatory wall 31a, with the movable expandable wall-door 32 shown opening and extending into aircraft cabin aisle 27. and opening to the degree necessary to accommodate a wheelchair 34 into the aircraft door entry area 29 (labelled in FIGS. 3 and 4). While a PRM is not shown in the wheelchair 34, it is understood that wheelchair 34 could be used to convey a PRM into the aircraft door entry area that is adjacent to the expandable aircraft lavatory 30. According to further aspects, the wheelchair 34 could be, as shown, a type of on-board aircraft wheelchair that can have a reduced overall width dimension as opposed to a standard "land-based" or "personal" wheelchair width. In addition, according to present aspects, the expanded dimensions of the moveable expandable wall-door can further accommodate larger, personal wheelchair of a PRM passenger.

Although not explicitly shown in FIG. 5, present aspects contemplate, when open, the movable expandable wall-door 32 leaves an opening in the expandable aircraft lavatory wall 31a, with the opening dimensioned to accommodate and facilitate easy entry of a PRM with or without a wheelchair. The dimension of the opening created in the expandable aircraft lavatory wall 31a is understood to approximate a first dimension of the movable expandable wall-door 32, with the first dimension of the movable expandable wall-door understood to be the dimension of the movable expandable wall-door 32 in an unexpanded state. While a wheelchair is shown for illustrative and exemplary purposes, it is further understood that the doorway into the expanded aircraft lavatory area formed to include the expanded aircraft lavatory second footprint is far wider than the door (shown as lavatory door 31 in subsequently described FIGS. herein) used to gain entry to the expandable aircraft lavatory, and that would be a door having the standard width of a conventional aircraft lavatory, which presents significant difficulty for entry of PRMs, and which further cannot admit wheelchairs or other devices typically used by PRMs.

FIG. 6 shows a perspective and partially exposed view of expandable aircraft lavatory 30 now in the expanded state such that the aircraft lavatory 30 has been expanded and converted from an aircraft lavatory first footprint (in the unexpanded/expandable state) into an aircraft lavatory second footprint (in the expanded state). The first and second footprints are viewable and more specifically outlined in subsequently described FIGS. herein. As shown in FIG. 6, the movable expandable wall-door 32 is now in a closed orientation with the movable expandable wall-door 32 engaged with monument wall section 14b of monument 14.

As described herein, and according to present aspects, the movable expandable wall-door 32 has transitioned or otherwise been converted from a "wall" of the expandable aircraft lavatory in the unexpanded or expandable state (e.g., in the aircraft lavatory first footprint having the aircraft lavatory first footprint area, and where the aircraft door entry area 29 is unimpeded, etc.) into a movable "door" of the expanded aircraft lavatory in the aircraft lavatory second footprint having the aircraft lavatory second footprint area, and where the aircraft door entry area 29 is now within and is otherwise a part of the aircraft lavatory second footprint. Again, in the expandable aircraft lavatory first footprint, the aircraft door entry area unimpeded, not impacted by and remains outside of the expandable aircraft lavatory, and the aircraft door entry area 29 is entirely outside of the expandable aircraft lavatory first footprint.

As further shown in FIG. 6, the movable expandable wall-door 32 (referred to equivalently herein as "wall-door" and "wall-door 32") includes a pivoting wall-door extendable panel 36 that is configured to remain in a stowed position (a stowed position that can be a folded position along an area of attachment to the wall-door 32 by, for example, fasteners, hinges, and any attachment devices that allow the pivoting wall-door extendable panel 36 to move through a selected range of motion relative to the wall-door 32 from a stowed position (e.g., a folded position) to an expanded or deployed position (e.g., an unfolded or fully extended position).

As further shown in FIG. 6, wall-door 32 includes multiple wall-door sections connected to one another or otherwise in movable communication with one another along their length to fold (e.g., in a hinged orientation, etc.) along at least one flexible wall-door region 33 shown as a dotted line. The flexible wall-door region 33 can facilitate the wall-door 32 being able to be folded along its length to increase a selected maneuverability and to otherwise facilitate the ability of the wall-door to negotiate around fixed or other objects that could impede the movement and range of motion of a one-piece, solid wall-door to convert from the aircraft lavatory first footprint (as a wall) into the lavatory second footprint (as a door).

According to present aspects, the wall-door 32 can comprise a selected plurality of longitudinally connected or adjoined wall-door sections (e.g., any useful number of wall-door sections that are hinged together longitudinally, etc.), and wall-door 32 can comprise one or more flexible longitudinal areas or regions of a one-piece material, or can incorporate space, longitudinal regions of a flexible material integrated into a rigid wall-door material. In a further aspect, the wall-door can be made from a material that is both rigid to retain its form (e.g., a substantially planar form), and that is also flexible enough to deform (e.g., deform out of plane to a selected degree) such that the wall-door 32 can be manipulated in the form of a bendable sheet of a selected thickness to allow the wall-door to negotiate an otherwise impeding fixture when a force (e.g., a manually applied force) is applied. As the force is removed, the wall-door can then return to a selected form (e.g., a planar form) to become the wall or door, depending on the wall-door's role in either the first or second lavatory footprints.

While FIG. 6 shows the wall-door 32 bifurcated into two longitudinal sections, according to present aspects, the wall-door 32 can comprise any number of longitudinal segments or sections that serve to facilitate the folding or bending, etc. of the wall-door, (e.g., folding longitudinally long its length, etc.) to facilitate the wall-door 32 converting from the "wall" function in the aircraft lavatory first footprint to the "door" function in the aircraft lavatory second footprint. For example, as the number of longitudinal sections selected increases, when the wall-door is moved between an engaged position in the first and second footprints, the wall-door may be moved in accordion-like fashion, with longitudinal sections folding back and forth against themselves (e.g., in "accordion-like" fashion, etc.), the wall-door may be rolled longitudinally upon itself, the wall-door may display the flexibility of a "roll-top" desk, or the wall-door may comprise any degree of repeatable longitudinal flexibility during the conversion of the lavatory from the first footprint to the second footprint, so long as the wall-door is able to maintain a rigid form as a wall or a door when engaged in the respective first lavatory footprint or second lavatory footprint.

FIG. 7 shows a perspective view of an expandable aircraft lavatory of the type shown in FIGS. 3 and 4, but with lavatory door 31 shown in a closed orientation relative to lavatory 30. FIG. 7 is a view that can be an "aft" view in a cabin from a position forward of the expandable aircraft lavatory. As shown in FIG. 7, the expandable aircraft lavatory is in the aircraft lavatory first footprint configuration with the unimpeded aircraft door entry area 29 partially visible. According to present aspects, the disclosed expandable aircraft lavatories can comprise one or more attendant seats 39 that can fold down (e.g., unfold) and deploy for seating a flight attendant during, for example, takeoff and landing, and/or that otherwise can be used by flight attendants to conform to regulatory agency requirements. When not in use, attendant seat 39 can fold up (e.g., stow). As visible in FIG. 7, an attendant seat 39 is shown secured to monument wall 15 of monument 14. In the aircraft lavatory first footprint, the attendant seat 39 shown in FIG. 7 is positioned adjacent to the aircraft door entry area 29. In the aircraft lavatory second footprint, when the aircraft door entry area adjacent the monument 14 is sealed off by the movable wall-door 32 (not shown in FIG. 7, it is understood that attendant seat 39 attached to monument wall 15 would come within the aircraft lavatory second footprint. FIG. 7 further shows a close-out monument panel 14b attached to monument wall 15 of monument 14. Close out monument panel 14b can be folded in a stowed position against monument wall 15 and can also be extended to a position folded out and away from monument wall 15 (while still attached, for example, in a hinged relationship with monument wall 15) in a deployed position.

FIG. 8 is a perspective view of the expandable aircraft lavatory as shown in FIG. 7 with the addition of a second attendant seat 40 secured to monument wall 15 and further positioned adjacent attendant seat 39. As shown in FIGS. 7 and 8, two attendant seats 39, 40 are secured to monument wall 15 and located adjacent aircraft door entry area 29, and both attendant seats 39, 40 are shown in a forward-facing orientation relative to the aircraft. Accordingly, when attendant seats 39, 40 are occupied by one or more flight attendant, such attendants would be "forward-facing" and otherwise have an obstructed or incomplete view of passengers seated behind them. Accordingly, present aspects further include viewing devices (e.g., camera displays, mirror assemblies, projected video/images and commensurate assemblies, etc., and not shown in FIGS. 7, 8) positioned within sight of the seated flight attendants to enable a seated and forward-facing flight attendant to reliably monitor passengers seated behind the forward-facing flight attendants.

According to present aspects, such viewing devices (not shown in FIGS. 7, 8) can be positioned against and/or within a monument or other location within the cabin that is located forward of (in front of) the forward-facing and seated attendant(s). The viewing device(s) can be located within or outside of the aircraft lavatory first footprint and or second footprint. Further, if the viewing device is located in communication with a wall of the expandable aircraft lavatory 30, or otherwise incorporated into or in communication with, for example, a header in communication with such wall (and viewable by a seated, forward-facing attendant), such viewing device can also exist within an aircraft lavatory first footprint. Such viewing device is not shown in FIG. 7 or 8.

FIG. 9A is a perspective view of the expandable aircraft lavatory 30 that can be of the type shown in FIG. 7 and/or FIG. 8. As shown in FIG. 9A, the movable expandable wall-door 32 is in a closed position, engaged with expandable lavatory wall 31a, and is configured as a "wall" portion of expandable (but unexpanded) aircraft lavatory 30 in the aircraft lavatory first footprint. In the aircraft lavatory first footprint, as shown in FIG. 9A, a pivoting wall-door extendable panel 36 of the movable expandable wall-door 32 is shown in a folded or stowed configuration. In the aircraft lavatory first footprint, and as shown in FIG. 9A, aircraft door entry area 29 is unimpeded by the expandable aircraft lavatory 30.

FIG. 9B is a perspective view of the expandable aircraft lavatory 30 that can be of the type shown in FIG. 7 and/or FIG. 8. As shown in FIG. 9B, the movable expandable wall-door 32 is now shown engaged in a closed position, engaged with close-out monument panel 14b of monument 14 (e.g., in a latched and lockable fastening configuration, etc.) and the movable expandable wall-door 32 is further shown movably attached to expandable aircraft lavatory wall section 31a with the wall-door 32 now configured as a "door" of expanded aircraft lavatory 30 in the aircraft lavatory second footprint. The aircraft lavatory second footprint comprises the movable expandable wall-door 32 configured as a door section and positioned adjacent aircraft cabin aisle 27, with the movable expandable wall-door 32 further positioned in a configuration that impedes or "blocks off" aircraft door entry area 29 (not visible in FIG. 9B) with the aircraft door entry area 29 now contained within and as a part of the aircraft lavatory second footprint.

As further shown in FIG. 9B, the movable expandable wall-door 32 comprises the pivoting wall-door extendable panel 36 in movable communication with the expandable door panel 32 and extended and deployed from the stowed configuration as shown in FIG. 9A. The pivoting wall-door extendable panel 36 can be movably joined to the expandable wall-door 32 along a hinged panel area 38 about which the pivoting wall-door extendable panel 36 can pivot relative to the wall-door 32. The hinged panel area 38 can comprise any joining mechanism facilitating the pivoting of the pivoting wall-door extendable panel 36 relative to the expandable wall-door panel 32 and can include, but is not limited to, one or more hinges, a weakened region that can be a repeatably bendable region between the pivoting wall-door extendable panel 36 and the expandable wall-door panel 32, etc.

In a present aspect where the hinged panel area 38 is formed by the presence of a weakened region between the pivoting wall-door extendable panel 36 and the expandable wall-door panel 32, the weakened region can be a part of a unitary wall-door structure with the pivoting wall-door extendable panel 36, and further, the expandable wall-door panel 32 can be made from the same material as the pivoting wall-door extendable panel 36, and with the pivoting wall-door extendable panel 36 and the expandable wall-door panel 32 representing a single piece having a pivoting wall-door extendable panel 36 incorporated into the expandable wall-door panel 32.

As shown in FIG. 9B the expandable aircraft lavatory is now shown converted into the aircraft lavatory second footprint with the movable expandable wall-door 32 now configured to be a door, and with the pivoting wall-door extendable panel 36 extended to a fully deployed and unfolded configuration, with the movable expandable wall-door 32 and the pivoting wall-door extendable panel 36 in the unfolded configuration both occupying the same plane that is, in the second footprint "closed door" configuration shown as being perpendicular to aircraft aisle 27.

FIGS. 10A, 10B, and 10C are overhead plan views of aspects of the present disclosure. Taken together as a progression, FIGS. 10A, 10B, and 10C show an expandable aircraft lavatory 30 initially having an aircraft lavatory first footprint ("$F_1$" shown in FIG. 10A), and then converting the wall-door 32 from a "wall" configuration in the aircraft lavatory first footprint (shown in FIG. 10A as "$F_1$") to a "door" configuration in the aircraft lavatory second footprint (shown in FIGS. 10B, 10C as "$F_2$").

FIG. 10A shows an overhead plan view of an expandable aircraft lavatory 30 of the type shown at least in FIG. 8 in an unexpanded state, with the enumerated features numbered similarly. FIG. 10A shows that the expandable aircraft lavatory can be positioned adjacent or in close proximity to an aircraft door entry area 29, as the aircraft interior door bustle 12a of aircraft door 12 is visible. As shown in FIG. 10A, the movable expandable wall-door 32 is in the closed position, engaged with expandable lavatory wall 31a, and is configured as a "wall" portion of expandable (but unexpanded) aircraft lavatory 30 in the aircraft lavatory first footprint, shown as the dotted line labelled "$F_1$". FIG. 10A further shows the aircraft lavatory second footprint, labelled as dotted line "$F_2$", that the aircraft lavatory 30 will be converted into, and that is shown in FIG. 10C. Still further, FIGS. 10A, 10B, and 10C show attendant seats 39, 40 in a stowed and folded position attached to monument wall 15. of monument 14.

FIG. 10B shows an overhead plan view of the expandable aircraft lavatory 30 being transitioned from an unexpanded state as a "wall" and having the aircraft lavatory first footprint $F_1$ (as shown in FIG. 10A) to an expanded state as a "door" and with the expandable aircraft lavatory 30 having the increased area of the aircraft lavatory second footprint $F_2$ (as shown in FIG. 10C). In FIG. 10B, during the transition of the aircraft lavatory 30 from an unexpanded state to an expanded state, the movable expandable wall-door 32 is pivoted away from expandable aircraft lavatory wall 31a into aircraft door entry area 29. As shown in FIG. 10B, wall-door 32 itself comprises a flexible wall-door region 33 (that can be, for example a longitudinally hinged wall-door region or section, etc.) about which sections of the wall-door 32 can pivot to negotiate immovable fixed structures that could otherwise impede the progress of the wall-door 32 were the wall-door 32 a single, unitary construction unable to so pivot and maneuver. As shown in FIGS. 10A, 10B and 10C, such an immovable fixed structure is represented by aircraft door bustle 12a, although other immovable structures may exist in the desired path of the wall-door 32 during its transition from a "wall" in the first footprint to a "door" in the second footprint, and vice versa.

According to present aspects, regulations for aircraft may require that areas near doorways remain viewable by flight personnel and secured in a locked position. When the presently disclosed expandable aircraft lavatory is in the expanded configuration having the second footprint that encompasses and closes at least a portion of the aircraft door entry area 29, it is recognized that once the movable expandable wall-door is moved into a closed configuration as a lavatory door, such area adjacent the aircraft door interior would be blocked from view while the lavatory in the expanded state having the second footprint is occupied. According to present aspects, access to the aircraft door by an expanded lavatory occupant is restricted and otherwise not possible in view of a substantially simultaneous deployment, during lavatory conversion, of an aircraft door barrier wall 35. Present aspects contemplate the deployment of an aircraft door barrier wall from any suitable location able to deploy such wall to the selected location adjacent the aircraft door from a stowed location including, for example, an area adjacent a monument, a lavatory wall, an aircraft floor, an aircraft ceiling, etc. and limited only by practical considerations that can include, for example, cost, available space, weight, design constraints, regulatory constraints, etc. In non-limiting fashion, FIG. 10A shows a representative storage of aircraft door barrier wall 35 resting against the exterior of the wall-door 32. During conversion/expansion of the expandable aircraft lavatory 30 from a first footprint $F_1$ into the larger second footprint $F_2$, aircraft door barrier wall remains fixed adjoined to expandable aircraft lavatory wall 31a at one end as the aircraft door barrier wall 35, as the barrier wall 35 is pivoted (for example, in a hinged configuration) outwardly and away from the movable expandable wall-door 32.

FIG. 10C shows an overhead plan view of the completion of the expandable aircraft lavatory conversion from the aircraft lavatory first footprint $F_1$ into the larger aircraft lavatory second footprint $F_2$, where the movable expandable wall-door is transitioned from a wall configuration in the first footprint into a door configuration in the second footprint. As shown in FIG. 10C, aircraft door barrier wall 35 is now in a final secure and preferably locked and tamperproof position with one end of the aircraft door barrier wall 35 attached to lavatory wall 31a and the other end of the aircraft door barrier wall engaged with and otherwise secured to monument wall 15 of monument 14. As further shown in FIG. 10C, the movable expandable wall-door 32 is brought to and rests at a final location in a closed door configuration in the lavatory second footprint, with the wall-door 32 now engaged with monument wall section 14b in the closed position.

As mentioned herein, in positioning attendant seats that accommodate attendants during phases of air travel including, for example, taxi, takeoff, and landing, etc., it may be desirable to have at least one attendant seat (and one seated attendant) positioned to maintain an unrestricted view of a passenger compartment. When such attendant seats are located forward of a passenger compartment, such attendant seats can be positioned to face aft to facilitate direct viewing of the passenger compartment. Present aspects contemplate a lavatory and adjacent monument configuration where at least one attendant seat can be located within the aircraft lavatory second footprint, and at least one attendant seat located outside of the aircraft lavatory second footprint, and attached to a nearby monument (e.g., a galley monument, closet, etc.) that can be located across an aircraft aisle from the expandable aircraft lavatory. According to further present aspects, each of the attendant seats can be located within the aircraft lavatory second footprint, including aspects where one or more attendant seat can be attached to, and otherwise positioned on the exterior of the expandable wall-door and immediately adjacent to an aircraft aisle when the wall-door is in the closed "door" configuration of the expanded lavatory second footprint configuration.

FIG. 11 shows a perspective view of the expandable aircraft lavatory 30 in an unexpanded state (first footprint) of the type and configuration shown at least in FIGS. 3, 4, and 7 herein, for example. As shown in FIG. 11, while one or more attendant seats can be located within an aircraft lavatory second footprint (not visible as illustrated in FIG. 11), an additional attendant seat 41 can be located adjacent to and otherwise attached to monument 16. While FIG. 11 depicts attendant seat 41 in a folded, or stowed state, when deployed and unfolded, a seated attendant could face aft, and could have an unrestricted view facing the passengers seated in the aircraft cabin.

FIG. 12A is a perspective view of an expandable aircraft lavatory 30 in an unexpanded state having the aircraft lavatory first footprint (equivalently referred to herein as an unexpanded configuration), and of the type and configuration similar to that shown in at least FIGS. 3, 4, 7, and 11 herein, for example. As shown in FIG. 12A, the expandable aircraft lavatory 30 in an unexpanded state having the aircraft lavatory first footprint, further comprises attendant seat 42 positioned immediately adjacent to and otherwise attached to the exterior of the movable expandable wall-door 32. While FIG. 12A depicts attendant seat 42 in a folded, or stowed state, when deployed and unfolded, a seated attendant could face aft, and could have a largely unrestricted view facing the passengers seated in the aircraft cabin. In the expandable (also referred to herein as the unexpanded state), attendant seat 42 in position attached to wall-door 32 is shown positioned adjacent to the aircraft door entry area 29. As explained herein with respect to FIG. 10A, FIG. 12A, shows a representative storage of aircraft door barrier wall 35 resting against the exterior of the wall-door 32.

FIG. 12B is an overhead plan view of the expandable aircraft lavatory 30 shown in FIG. 12A, and in an unexpanded state having the aircraft lavatory first footprint, with the wall-door 32 positioned in the "wall" configuration. As shown in FIG. 12B, an additional attendant seat 39 is shown attached to monument wall 15 of monument 14, and is positioned adjacent the aircraft door entry area 29. As explained herein with respect to FIG. 10A, FIG. 12A, shows a representative storage of aircraft door barrier wall 35 resting against the exterior of the wall-door 32. In the expandable lavatory first footprint (also referred to herein as the unexpanded state), attendant seat 42 in position attached to wall-door 32 is shown positioned adjacent to the aircraft door entry area 29. As also shown in FIG. 12A, FIG. 12B, shows a representative storage of aircraft door barrier wall 35 resting in a stowed configuration against the exterior of the wall-door 32 in the "wall" configuration.

FIG. 12C is a perspective view of the expandable aircraft lavatory 30 shown in FIGS. 12A and 12B, but with the aircraft lavatory 30 now in the expanded state with the wall-door 32 in the "door" configuration of the aircraft lavatory second, and larger, footprint as compared to the aircraft lavatory first footprint of the expandable aircraft lavatory 30 (as shown in FIGS. 12A and 12B), and with the wall-door 32 closed and resting adjacent aircraft aisle 27 and with aircraft door entry area 29 (not shown in FIG. 12C) now subsumed and otherwise contained within the aircraft lavatory second footprint. As shown in FIG. 12C, in the expanded lavatory state, attendant seat 42 is shown in position attached to wall-door 32 positioned adjacent to the aircraft aisle 27, enabling an attendant, when seated on the attendant seat in an unfolded state, to have a view of passengers in an aircraft cabin located aft of the attendant seat 42.

As further shown in FIG. 12C, wall-door 32 now in the "door" configuration of the expandable aircraft lavatory 30 in the expanded (aircraft lavatory second footprint) configuration, comprises a pivoting wall-door extendable panel 36 described herein (and shown at least in FIGS. 6, 9A and 9B) that is now in an expanded (e.g., unfolded) configuration and brought from the out-of-plane "stowed" or folded position to a deployed and "unfolded" state that is substantially in the same plane as the wall door 32. As shown in FIG. 12C, the pivoting wall-door extendable panel 36 has been deployed to move through a selected range of motion relative to the wall-door 32 from a stowed position (e.g., a folded position) to an expanded or deployed position (e.g., an unfolded or fully extended position) by pivoting about hinged panel area 38, also described herein and shown at least in FIGS. 9A and 9B.

FIG. 12D is an overhead plan view of the expandable aircraft lavatory 30 shown in FIG. 12C and again shown (as in FIG. 12C) in the expanded lavatory state, with the aircraft lavatory 30 having the aircraft lavatory second footprint with the wall-door 32 positioned in the "door" configuration with the wall-door shown in the closed configuration and positioned in the closed position adjacent aircraft aisle 27. As shown in FIG. 12D, an additional attendant seat 39 is shown attached to monument wall 15 of monument 14, and is positioned adjacent the aircraft door entry area 29, and within the second footprint. As explained herein, (at least with respect to FIG. 10A and FIG. 12C), FIG. 12D shows a representative deployment from a stowed configuration (as shown in FIG. 12B) of aircraft door barrier wall 35 with aircraft door barrier 35 now in a deployed configuration blocking access to aircraft door bustle 12a. In the expandable lavatory second footprint (also referred to herein as the unexpanded state), attendant seat 42 in position is shown in FIG. 12D attached to the exterior of wall-door 32 and is now shown positioned adjacent to the aircraft cabin aisle 27.

While certain aspects disclosed herein can be directed to double-aisle aircraft having a seating configuration, for example, that can be of the type shown in FIG. 2, present aspects contemplate fitting and/or retro-fitting a single-aisle aircraft with the expandable aircraft lavatories disclosed herein, along with the presently-stated construction and benefits applying to the use of the expandable aircraft lavatories disclosed herein, useful in both multi-aisle and single-aisle aircraft. In addition, if the location of a lavatory employing present aspects is not located proximate to an aircraft door (e.g., if the aircraft door interior is not located within an expanded aircraft lavatory second footprint, etc.), present aspects need not incorporate a door barrier 35 of the type shown in the FIGS., or otherwise described herein. The benefits and advantages of the expandable aircraft lavatory 30a, at least with respect to the "convertability" and "dimension (area)-altering"/"dimension (area)-increasing"/"dimension (area)-decreasing", etc., of the lavatory footprint from a smaller first footprint (in the unexpanded state) to an expanded aircraft lavatory second footprint that is significantly greater than the smaller unexpanded (e.g., "expandable") aircraft lavatory first footprint (including converting the footprint from the second footprint back to the first footprint), include benefits and advantages also found with respect to the expandable aircraft lavatory 30 described herein.

FIG. 13 illustrates an expandable aircraft lavatory 30a comprising alternate aspects as compared to the expandable aircraft lavatory 30 disclosed herein and shown, for example, at least in FIGS. 12A-12D. Once difference shown in FIG. 13 relates to and otherwise depicts an alternate construction for the wall-door 32, according to further present aspects. As shown in FIG. 13, expandable aircraft lavatory 30a in the expanded state and having an aircraft second footprint comprises a pocketed expandable wall-door 32a that can be hingedly attached to expandable aircraft lavatory wall 31a via hinges, etc. (not shown), and that further can be a single longitudinally extending hinge, and/or more than one hinges in series, etc., with the hinges extending a selected distance that can be equivalent to a selected length along the length of pocketed expandable wall-door 32a.

As shown in FIG. 13, pocketed wall-door 32a, in the closed position, "bounds" an aircraft lavatory second footprint of the expandable aircraft lavatory 30a. Pocketed wall-door 32a differs from the movable expandable wall door 32 shown at least in FIGS. 12A-12D herein, and as described herein, with pocketed wall-door 32a representing an alternate configuration as compared with the movable expandable wall-door 32 that accommodates a pivoting wall-door extendable panel 36. As shown in FIG. 13, a pocketed wall-door 32a comprises a nested wall-door panel 36a that can repeatably extend from and retract into the pocketed wall-door 32a. According to present aspects, the pocketed wall-door 32a comprises a cavity that can be bounded and/or "surrounded", and otherwise defined by pocketed wall-door walls to form the pocketed wall-door 32a. The cavity within the pocketed wall door 32a is dimensioned to receive (e.g., in a close frictional fit, etc.) the nested wall-door panel 36a, such that the nested wall-door panel 36a can be withdrawn from the pocketed wall-door 32a and configured to expose a selected area of the nested wall-door panel 36a as the pocketed wall-door 32a converts from a door in the aircraft lavatory first footprint (where the nested wall-door panel 36a can be fully retracted to a "stored" or "stowed" configuration within the pocketed wall-door 32a), for example, where no portion of the nested wall-door panel is exposed beyond the pocked wall-door/ nested wall-door panel interface 38a when in a "door" configuration. The nested wall-door panel 36a can then be extended from and/or withdrawn from the pocketed wall-door 32a to form a "wall" configuration of the wall-door in the second footprint; e.g. where the nested wall-door panel 36a can be withdrawn from the pocketed wall-door 32a to a selected distance to expose a selected amount of nested wall-door panel area above the pocked wall-door/nested wall-door panel interface 38a.

According to present aspects, although not specifically shown in the FIGS., the nested wall-door panel 36a can be manually extended from (and withdrawn a selected distance from) and out of a nested position within the pocketed wall-door 32a. In addition, according to present aspects, the nested wall-door panel 36a can be automatically and/or mechanically driven to extend from (e.g., withdrawn a selected distance from) and brought out of the pocketed wall-door 32a, with the nested wall-door panel 36a and/or the pocketed wall door 32a in communication with or otherwise comprising the necessary mechanical components including, for example, motors, drives, actuators, controllers, power sources, receivers, transmitters, etc., to move the nested wall-door panel to a selected height or distance beyond the pocked wall-door/nested wall-door panel interface 38a to form a selected dimension for the wall-door 32a that can completely "close-out" the aircraft lavatory second footprint, for example, against or proximate to an aircraft cabin ceiling, etc.

FIG. 14 is a cross-sectional, enlarged view of a section of the pocketed wall-door 32a shown in FIG. 13 taken across line 14-14 shown in FIG. 13. As shown in FIG. 14, pocketed wall-door 32a is constructed and otherwise configured to surround nested wall-door panel 36a in a close fit that can be a frictional arrangement or "fit". According to present aspects, as the nested wall-door panel 36a is moved via an applied force (e.g., withdrawn/deployed or retracted/stowed) within pocketed wall-door 32a, the nested wall-door panel 36a can be moved to and maintained in a selected position and otherwise "held" or retained in position by the pocketed wall-door sides. In a fully retracted, or stowed, position (not shown) the top of the nested wall-door panel 36 can be approximately flush with the top of the pocketed wall-door at the illustrated pocked wall-door/nested wall-door panel interface 38a. Such pocked wall-door/nested wall-door panel interface 38a can be part of the outermost perimeter of the pocketed wall-door 32a, for example, when the pocketed wall-door 32a is configured to be a "wall" in an engaged position within the aircraft lavatory first footprint.

As shown in FIG. 14, in the aircraft lavatory second footprint, where the aircraft lavatory 30a is expanded into such an aircraft lavatory second footprint, the pocketed wall-door 32a is configured to be an engaged door, with a selected portion of the nested wall-door panel 36a extracted or removed from the pocketed wall-door 32a to a selected distance (e.g., :height") sufficient to "close" out the expanded aircraft lavatory second footprint; for example, with the top of the nested wall-door panel 36a brought into close proximity with an aircraft cabin ceiling.

FIGS. 15-18 are flowcharts outlining methods according to presently disclosed aspects. As shown in FIG. 15, a method 100 is disclosed for converting an aircraft lavatory dimension from a first dimension to a second converted dimension, with the method 100 including altering 102 an aircraft lavatory dimension from an aircraft lavatory first footprint having an aircraft lavatory first footprint area to an aircraft lavatory second footprint having an aircraft lavatory second footprint area, with the aircraft lavatory first footprint bounded by at least three aircraft lavatory first footprint wall sections, with at least two aircraft lavatory first footprint wall sections in communication with a movable lavatory wall-door, and with the aircraft lavatory second footprint bounded by at least three aircraft lavatory second footprint wall sections, with one of the at least three aircraft lavatory second footprint wall sections located immediately adjacent to and parallel to an aircraft door bustle, with the movable expandable wall-door including at least one expandable door panel, with the expandable door panel having a first unexpanded door panel area in a stowed door panel configuration in the aircraft lavatory first footprint, and with the expandable door panel having a second expanded door panel area in a deployed door panel configuration in the aircraft lavatory second footprint.

The method 100 as shown in FIG. 15 further includes disengaging 104 the movable expandable lavatory wall-door from at least one aircraft lavatory first footprint wall section, engaging 106 the movable expandable lavatory wall-door with at least one aircraft lavatory second footprint wall section, deploying 108 the expandable door panel from the first unexpanded door panel area in a stowed and unexpanded state to the second expanded door panel area in a deployed and expanded state, and converting 110 the aircraft lavatory first footprint into the aircraft lavatory second footprint. The method 100 is understood to employ the apparatuses disclosed herein and shown at least in FIGS. 5, 6, 9B, 10C, 12C, and 12D.

FIG. 16 outlines a presently disclosed method 200 comprising the steps of method 100, and further comprising increasing 202 the aircraft lavatory dimension from the aircraft lavatory first footprint area to the aircraft lavatory second footprint area, and wherein the aircraft lavatory second footprint area is greater than the aircraft lavatory first footprint area. The method 200 is understood to employ the apparatuses disclosed herein and shown at least in FIGS. 5, 6, 9B, 10C, 12C, and 12D.

FIG. 17 outlines a presently disclosed method 300 comprising the steps of methods 100 and 200, and further comprising incorporating 302 at least one of a portion of attendant area or an aircraft door entry area into the aircraft lavatory second footprint area. The method 300 is understood to employ the apparatuses disclosed herein and shown at least in FIGS. 5, 6, 9B, 10C, 12C, and 12D.

FIG. 18 is a flowchart outlining a method 400 for installing an expandable aircraft lavatory in an aircraft, with the method comprising altering 102 an aircraft lavatory dimension from an aircraft lavatory first footprint having an aircraft lavatory first footprint area to an aircraft lavatory second footprint having an aircraft lavatory second footprint area, with the aircraft lavatory first footprint bounded by at least three aircraft lavatory first footprint wall sections, with at least two aircraft lavatory first footprint wall sections in communication with a movable lavatory wall-door, and with the aircraft lavatory second footprint bounded by at least three aircraft lavatory second footprint wall sections, with one of the at least three aircraft lavatory second footprint wall sections located immediately adjacent to and parallel to an aircraft door bustle, with the movable expandable wall-door including at least one expandable door panel, with the expandable door panel having a first unexpanded door panel area in a stowed door panel configuration in the aircraft lavatory first footprint, and with the expandable door panel having a second expanded door panel area in a deployed door panel configuration in the aircraft lavatory second footprint.

The method 400 as shown in FIG. 18 further includes disengaging 104 the movable expandable lavatory wall-door from at least one aircraft lavatory first footprint wall section, engaging 106 the movable expandable lavatory wall-door with at least one aircraft lavatory second footprint wall section, deploying 108 the expandable door panel from the first unexpanded door panel area in a stowed and unexpanded state to the second expanded door panel area in a deployed and expanded state, and converting 110 the aircraft lavatory first footprint into the aircraft lavatory second footprint, increasing 202 the aircraft lavatory dimension from the aircraft lavatory first footprint area to the aircraft lavatory second footprint area, and wherein the aircraft lavatory second footprint area is greater than the aircraft lavatory first footprint area, incorporating 302 at least one of a portion of attendant area or an aircraft door entry area into the aircraft lavatory second footprint area, and installing 402 the expandable aircraft lavatory in an aircraft cabin. Method 400 is understood to employ the apparatuses disclosed herein and that are shown at least in FIGS. 5, 6, 9B, 10C, 12C, and 12D.

The present aspects may, of course, be carried out in other ways than those specifically set forth and presently disclosed herein without departing from essential characteristics of the disclosure. The present aspects are to be considered in all respects as illustrative and not restrictive, and all changes coming within the meaning and equivalency range of the appended claims are intended to be embraced therein.

What is claimed is:

1. An expandable aircraft lavatory comprising:
an aircraft lavatory first footprint in an unexpanded aircraft lavatory configuration, said aircraft lavatory first footprint having a first aircraft lavatory footprint area, said first aircraft lavatory footprint bounded by at least three first aircraft lavatory footprint wall sections and a movable expandable wall-door, said movable expandable wall-door movable from a first aircraft lavatory footprint closed position to a first aircraft lavatory footprint open position, said movable expandable wall-door comprising:
a wall-door interior;
a wall-door exterior;
at least one expandable door panel, said expandable door panel in an expandable door panel stowed configuration in the aircraft lavatory first footprint, said expandable door panel configured to be extended from the expandable door panel stowed configuration into an expanded door panel deployed configuration;
an aircraft lavatory second footprint in an expanded aircraft lavatory configuration, said aircraft lavatory second footprint having an aircraft lavatory second footprint area, said aircraft lavatory second footprint bounded by at least three aircraft lavatory second footprint wall sections and the movable expandable wall-door, said movable expandable wall-door configured to be moved through a range of motion from an aircraft lavatory first footprint closed position to an aircraft lavatory second footprint closed position, said movable expandable wall-door in the aircraft lavatory second footprint configured to abut an aircraft cabin aisle;
wherein said aircraft lavatory second footprint area is greater than the aircraft lavatory first footprint area;
wherein in the unexpanded aircraft lavatory configuration and in the first aircraft lavatory footprint the movable expandable wall-door in the aircraft lavatory first footprint closed position is configured to abut an aircraft door entry area; and
wherein in the expanded aircraft lavatory configuration and in the aircraft lavatory second footprint the movable expandable wall-door in the aircraft lavatory second footprint closed position is configured to abut an aircraft aisle and is further configured to impede access to the aircraft door entry area; and
wherein the aircraft lavatory second footprint further comprises:
at least one retractable barrier wall, said at least one retractable barrier wall positioned proximate to an aircraft door bustle of an aircraft door when the expandable aircraft lavatory is in the expanded aircraft lavatory configuration, said at least one retractable barrier wall configured to engage at least two of the second aircraft lavatory footprint wall sections.

2. The expandable aircraft lavatory of claim 1, wherein the movable expandable wall-door comprises a movable expandable wall-door width able to accommodate a wheelchair.

3. The expandable aircraft lavatory of claim 1, wherein said aircraft lavatory first footprint is bounded in an engageable configuration by a plurality of fixed first lavatory wall panels and the movable expandable wall-door, said movable expandable wall-door comprising the expandable door panel in a stowed configuration.

4. The expandable aircraft lavatory of claim 1, wherein the expanded aircraft lavatory configuration comprises at least one attendant seat mounted to a wall within the in the aircraft lavatory second footprint.

5. The expandable aircraft lavatory of claim 1, wherein the at least one retractable barrier wall is configured to be at least a portion of one of the at least three aircraft lavatory second footprint wall sections.

6. An aircraft comprising the expandable aircraft lavatory of claim 1.

7. The expandable aircraft lavatory of claim 1, wherein the expanded aircraft lavatory configuration comprises at least one attendant seat within the aircraft lavatory second footprint.

8. The expandable aircraft lavatory of claim 7, wherein the aircraft lavatory second footprint is configured to comprise a plurality of attendant seats within the second aircraft lavatory footprint.

9. The expandable aircraft lavatory of claim 1, wherein the expanded aircraft lavatory configuration comprises a plurality of attendant seats mounted to a wall within the expanded aircraft lavatory configuration.

10. An aircraft comprising the expandable aircraft lavatory of claim 9.

11. The expandable aircraft lavatory of claim 4, wherein the expanded aircraft lavatory configuration further comprises at least one attendant seat in communication with the movable wall-door exterior.

12. An aircraft comprising the expandable aircraft lavatory of claim 11.

13. A method for converting an aircraft lavatory dimension from a first dimension to a second dimension, the method comprising:
altering an aircraft lavatory dimension of an expandable aircraft lavatory from an aircraft lavatory first footprint to an aircraft lavatory second footprint, said aircraft lavatory first footprint bounded by at least three aircraft lavatory first footprint wall sections, with at least two aircraft lavatory first footprint wall sections in communication with a movable expandable wall-door in a movable expandable wall-door wall configuration, said aircraft lavatory second footprint bounded by aircraft lavatory second footprint wall sections, one of said at least three aircraft lavatory second footprint wall section comprising a retractable barrier wall located proximate to an aircraft door bustle of an aircraft door, said movable expandable wall-door in the aircraft lavatory second footprint configured to abut an aircraft aisle, said movable expandable wall-door comprising at least one wall-door panel, said at least one wall-door panel having a first unexpanded door panel area in a stowed door panel configuration in the aircraft lavatory first footprint, said at least one wall-door panel having an expanded door panel area in a deployed door panel configuration in the aircraft lavatory second footprint;
disengaging the movable expandable wall-door from at least one first aircraft lavatory footprint area wall section;
engaging the movable expandable wall-door with at least one aircraft lavatory second footprint area wall section;
deploying the at least one wall-door panel from the first unexpanded door panel area in the stowed door panel configuration to the second expanded door panel area in the deployed door panel configuration; and
converting the aircraft lavatory first footprint into the aircraft lavatory second footprint.

14. The method of claim 13, further comprising:
increasing the aircraft lavatory dimension from the aircraft lavatory first footprint to the aircraft lavatory second footprint; and
wherein the aircraft lavatory second footprint is greater than the aircraft lavatory first footprint.

15. The method of claim 13 further comprising:
incorporating at least a portion of an aircraft door entry area into the aircraft lavatory second footprint.

16. The method of claim 13, wherein the retractable barrier wall is configured to deploy automatically in response to a signal from a processor received by a controller in communication with the at least one retractable barrier, said signal sent from a transmitter, said transmitter in communication with the movable expandable wall-door, said signal indicating that the aircraft lavatory second footprint has been established and further indicating that the movable expandable wall-door is in a closed position to form the expandable aircraft lavatory in the expanded aircraft lavatory configuration having the aircraft lavatory second footprint.

17. A method comprising:
installing an expandable aircraft lavatory in an aircraft, said expandable aircraft lavatory comprising:
an aircraft lavatory first footprint in an unexpanded aircraft lavatory configuration, said aircraft lavatory first footprint having an aircraft lavatory first footprint area, said aircraft lavatory first footprint bounded by at least three aircraft lavatory first footprint wall sections and a movable expandable wall-door, said movable expandable wall-door movable from an aircraft lavatory first footprint closed position to an aircraft lavatory first footprint open position, said movable expandable wall-door in a closed position bordering a passenger egress, said passenger egress located proximate to an aircraft door, said movable expandable wall-door comprising:
at least one wall-door panel, said at least one wall-door panel having a first expandable lavatory door panel area in the aircraft lavatory first footprint and in a stowed door panel configuration, said at least one wall-door panel having a second expandable lavatory door panel area in a deployed expandable lavatory door panel configuration;
an aircraft lavatory second footprint in an expanded aircraft lavatory configuration, said aircraft lavatory second footprint having an aircraft lavatory second footprint area, said aircraft lavatory second footprint bounded by at least three aircraft lavatory second footprint wall sections and the movable expandable wall-door, said movable expandable wall-door movable through a range of motion from an aircraft lavatory first footprint closed position to an aircraft lavatory second footprint closed position;
wherein said aircraft lavatory second footprint area is greater than the aircraft lavatory first footprint area;
wherein in the unexpanded aircraft lavatory configuration and in the aircraft lavatory first footprint the movable expandable wall-door in the aircraft lavatory first footprint closed position is configured to abut an aircraft door entry area; and
wherein in the expanded aircraft lavatory configuration and in the aircraft lavatory second footprint the movable expandable wall-door is configured to abut an aircraft aisle and is further configured to impede access to an aircraft door entry area.

18. The method of claim 17, further comprising:
incorporating at least a portion of an aircraft door entry area into the aircraft lavatory second footprint.

19. The method of claim 17, wherein the aircraft lavatory second footprint further comprises;
at least one retractable barrier wall, said at least one retractable barrier wall positioned proximate to an aircraft door bustle when the expandable aircraft lavatory is in the expanded aircraft lavatory configuration, said at least one retractable barrier wall configured to engage at least two of the aircraft lavatory second footprint wall sections.

20. The method of claim 19, wherein the at least one retractable barrier wall is configured to be at least a portion of one of the at least three aircraft lavatory second footprint wall sections.

* * * * *